(12) United States Patent
Gurbuxani et al.

(10) Patent No.: US 11,836,741 B2
(45) Date of Patent: Dec. 5, 2023

(54) SYSTEMS AND METHODS FOR IDENTIFYING, TRACKING, AND MANAGING A PLURALITY OF SOCIAL NETWORK USERS HAVING PREDEFINED CHARACTERISTICS

(71) Applicant: Captiv8, Inc., San Mateo, CA (US)

(72) Inventors: Vishal Gurbuxani, Santa Clara, CA (US); Sunil Verma, Fremont, CA (US); Krishna Subramanian, San Francisco, CA (US); Chris Ji, Milpitas, CA (US)

(73) Assignee: CAPTIV8 INC., San Francisco, CA (US)

( * ) Notice: Subject to any disclaimer, the term of this patent is extended or adjusted under 35 U.S.C. 154(b) by 56 days.

(21) Appl. No.: 16/951,181

(22) Filed: Nov. 18, 2020

(65) Prior Publication Data

US 2021/0150541 A1 May 20, 2021

Related U.S. Application Data

(60) Provisional application No. 62/939,759, filed on Nov. 25, 2019, provisional application No. 62/937,387, filed on Nov. 19, 2019.

(51) Int. Cl.
*G06N 3/08* (2023.01)
*G06Q 30/018* (2023.01)
(Continued)

(52) U.S. Cl.
CPC ......... *G06Q 30/0185* (2013.01); *G06F 16/27* (2019.01); *G06N 3/08* (2013.01);
(Continued)

(58) Field of Classification Search
CPC ...................................................... G06N 3/08
See application file for complete search history.

(56) References Cited

U.S. PATENT DOCUMENTS

| | | | |
|---|---|---|---|
| 2015/0082448 A1* | 3/2015 | Elovici | G06F 21/6245 726/26 |
| 2015/0262193 A1* | 9/2015 | Carvalho | G06Q 30/0185 705/318 |

(Continued)

FOREIGN PATENT DOCUMENTS

| | | |
|---|---|---|
| WO | 2015003031 A1 | 1/2015 |
| WO | 2015130398 A1 | 9/2015 |
| WO | 2019204670 A2 | 10/2019 |

OTHER PUBLICATIONS

Alom et al., "Detecting spam accounts on Twitter", 2018 (Year: 2018).*

(Continued)

*Primary Examiner* — Selene A. Haedi
(74) *Attorney, Agent, or Firm* — Novel IP

(57) ABSTRACT

Systems and methods of an integrated technology platform create a marketplace providing dashboards configured to allow brands and social media influencers to directly connect with each other. The system includes an integrated platform that enables an advertising party to find social media influencers who are most suited to the brands' contexts, market appeal, and demographic targets, build and manage relationships with the influencers, and identify fake influencers using machine learning models.

21 Claims, 19 Drawing Sheets

(51) Int. Cl.
*G06Q 50/00* (2012.01)
*G06F 16/27* (2019.01)
*G06Q 30/0241* (2023.01)
*G06Q 30/0251* (2023.01)
*G06Q 30/0201* (2023.01)
*G06Q 30/0242* (2023.01)
*G06N 3/084* (2023.01)

(52) U.S. Cl.
CPC ......... *G06N 3/084* (2013.01); *G06Q 30/0201* (2013.01); *G06Q 30/0242* (2013.01); *G06Q 30/0269* (2013.01); *G06Q 30/0276* (2013.01); *G06Q 50/01* (2013.01)

(56) References Cited

U.S. PATENT DOCUMENTS

| | | | |
|---|---|---|---|
| 2018/0240131 A1* | 8/2018 | Denner | G06Q 50/01 |
| 2018/0260909 A1 | 9/2018 | Li | |
| 2018/0314971 A1* | 11/2018 | Chen | G06N 20/00 |
| 2019/0068632 A1* | 2/2019 | Foster | H04L 63/1416 |
| 2020/0045066 A1* | 2/2020 | Meng | H04L 63/1416 |

OTHER PUBLICATIONS

Lee et al., "Uncovering Social Spammers: Social Honeypots + Machine Learning", 2010 (Year: 2010).*
Satya et al., "Uncovering Fake Likers in Online Social Networks", 2016 (Year: 2016).*
Zheng et al., "Detecting Spammers on Social Networks", 2015 (Year: 2015).*
Song et al., "Prestopping: How Does Early Stopping Help Generalization Against Label Noise?", Nov. 19, 2019 (Year: 2019).*
International Search Report for PCT/US2020/060980, dated May 4, 2021.
Written Opinion of the International Searching Authority for PCT/US2020/060980, dated May 4, 2021.

* cited by examiner

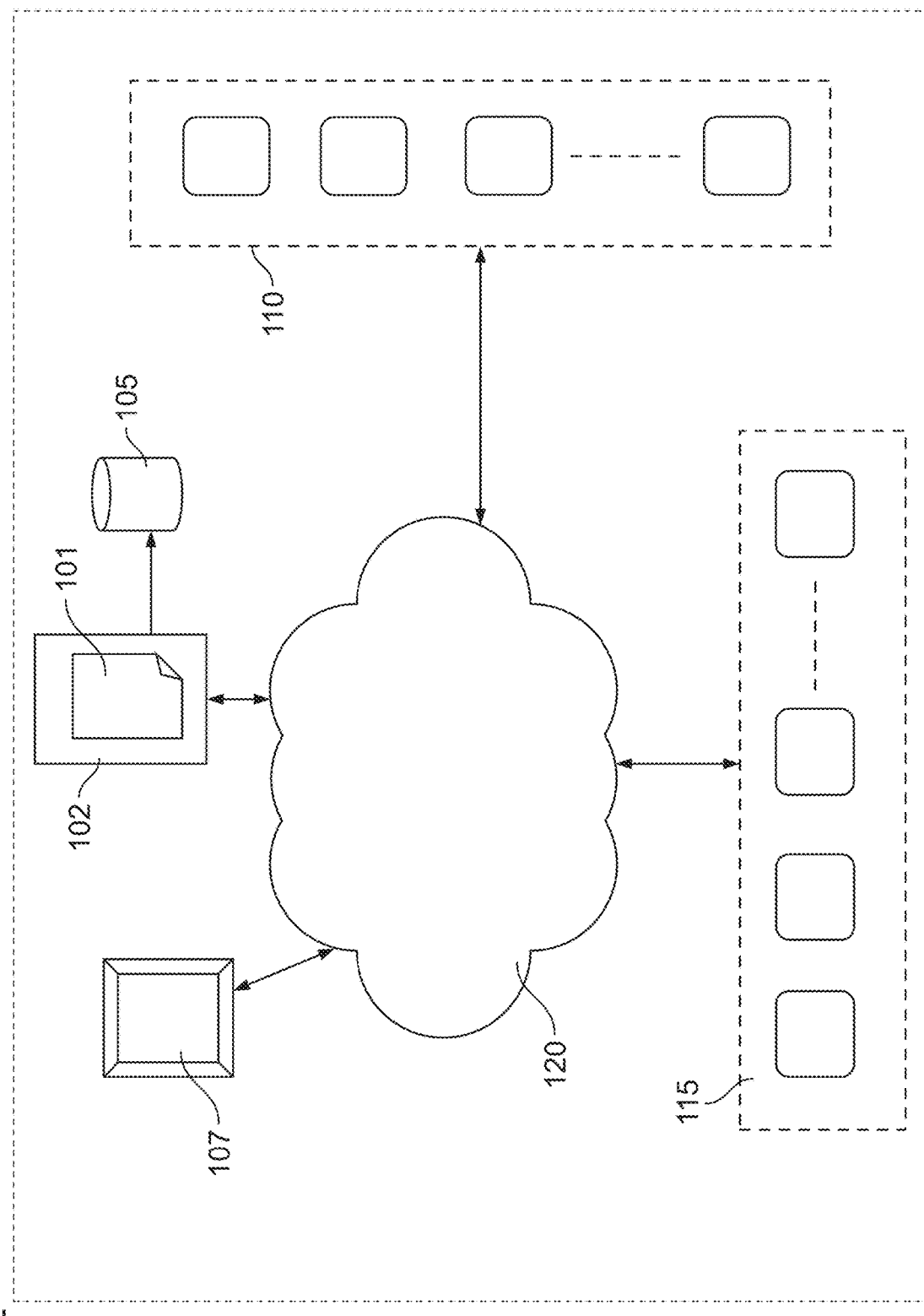

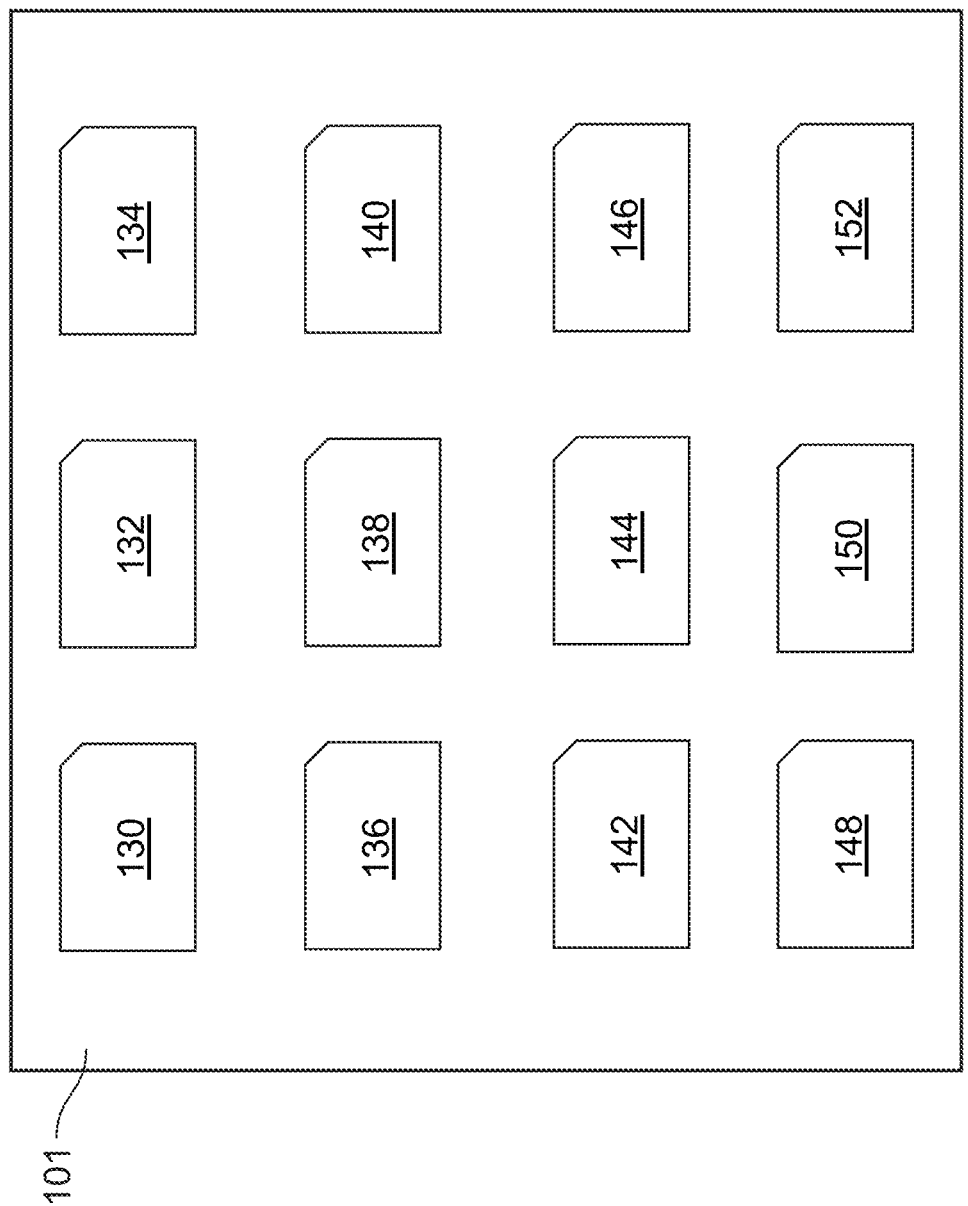

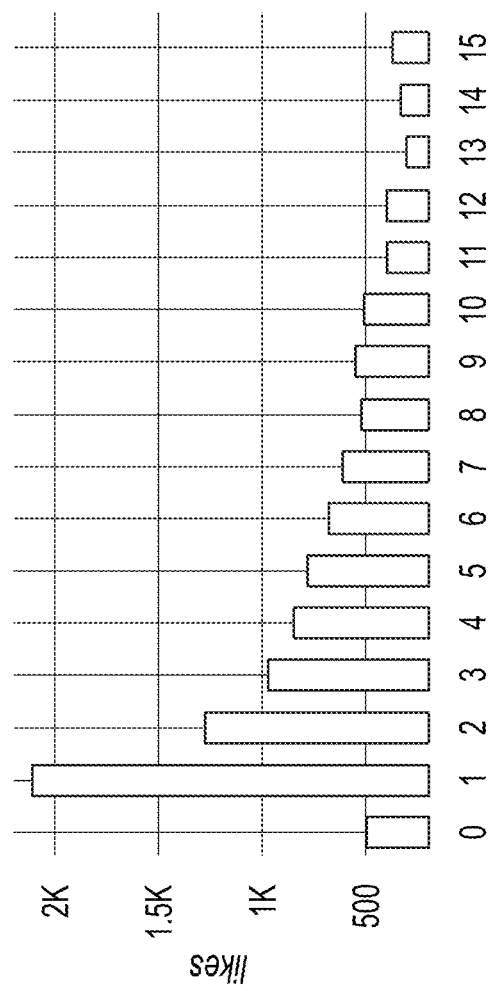
FIG. 3A

FIG. 3B

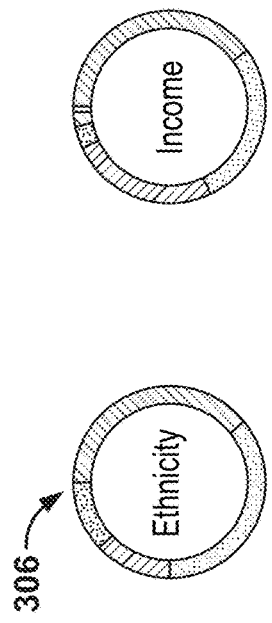

306

Ethnicity 39.29% Hispanic
35.59% White / Caucasian
13.19% Asian
11.92% African American

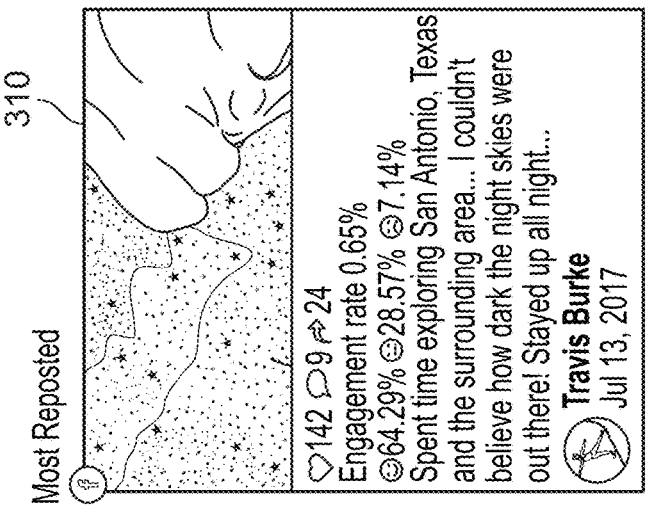

Income 40.15% 0-20,000
27.54% 20,001-40,000
25.08% 40,001-60,000
3.87% 60,001-80,000
2.32% 100,001+
1.03% 80,001-100,000

FIG. 3C

Most Viewed

308

♡15.47K ♡403 ⊏⊐64.19K
Engagement rate 2.45%
☺50% ☺40.63% ☺9.38%
Got the amazing opportunity to explore San Antonio and all of the incredible activities it has to offer. A week full of memories and epic...

Rob Strok
Jun 27, 2017

Most Reposted

310

♡142 ♡9 ↗24
Engagement rate 0.65%
☺64.29% ☺28.57% ☺7.14%
Spent time exploring San Antonio, Texas and the surrounding area... I couldn't believe how dark the night skies were out there! Stayed up all night...

Travis Burke
Jul 13, 2017

Sample Engagement of a Creator

| Milestone | Scope | Metric | Delivery Date | Fee | Remedy for Late or Poor Delivery |
|---|---|---|---|---|---|
| 1 | 3 Steemit articles<br>2 Reddit articles<br>4 YouTube videos | 10,000 new followers<br>2,000 favorable comments<br>500 amplifications | 23 Sep | 10,000 CR8 tokens | 10% deduction |
| 2 | 7 Steemit articles<br>10 Reddit articles<br>4 YouTube videos | 20,000 new followers<br>4,000 favorable comments<br>1,000 amplifications | 15 Oct | 40,000 CR8 tokens | 20% deduction |
| 3 | 4 Steemit articles<br>6 Reddit articles<br>8 YouTube videos | 30,000 new followers<br>6,000 favorable comments<br>2,000 amplifications | 20 Oct | 70,000 CR8 tokens | 30% deduction |
| 4 | 8 Steemit articles<br>6 Reddit articles<br>20 YouTube videos | 40,000 new followers<br>8,000 favorable comments<br>5,000 amplifications | 25 Oct | 90,000 CR8 tokens | 50% deduction |
| 5 | 14 Steemit articles<br>45 Reddit articles<br>9 YouTube videos | 5 million tokens sold directly because of the content<br>Token project receives favorable posts directly because of the content | 31 Oct | 900,000 CR8 tokens | 70% deduction |

FIG. 8

SYSTEMS AND METHODS FOR IDENTIFYING, TRACKING, AND MANAGING A PLURALITY OF SOCIAL NETWORK USERS HAVING PREDEFINED CHARACTERISTICS

CROSS-REFERENCE

The present application relies on U.S. Patent Provisional Application No. 62/937,387 titled "Systems and Methods for Identifying, Tracking, and Managing Social Media Influencers", filed on Nov. 19, 2019 and U.S. Patent Provisional Application No. 62/939,759 titled "Systems and Methods for Identifying, Tracking, and Managing Social Media Influencers", filed on Nov. 25, 2019 for priority. The above-mentioned applications are herein incorporated by reference in their entirety.

FIELD

The present specification generally relates to determining a degree of authenticity and/or reach of certain users of social networks. More particularly, the present specification relates to a platform that integrates multiple tasks and services associated with identifying, tracking, validating, and/or connecting with certain users of social networks, also referred to as social media influencers.

BACKGROUND

Influencer marketing is a relationship-based marketing model in which individuals having a demonstrable following via one or more social media platforms use, tap, or otherwise leverage that following in order to promote a product or service. Brands consider social media influencers important for their modern marketing initiatives. Influencer marketing platforms and agencies, and their combinations, are typically entities that provide influencer marketing services. The agencies offer a rich experience/database for matching advertising requirements of brands with influencers and even assist in vetting the selected influencers. The agencies also follow-up on marketing campaigns and ensure an efficient completion. Some key functions performed by the agencies include identifying influencers, negotiating with the influencers, advising on campaign strategy, managing posts by the influencers (including content creation and approval prior to publication), executing and reporting the campaigns, and collecting data for subsequent analysis.

There are multiple technology stakeholders participating in the modern influencer marketing models. These include analytic companies that are focused on ingesting public data and providing ranking, reporting, search, and/or discovery and software platforms used by brands and agencies to properly understand and analyze social channels.

Another stakeholder includes the social marketing platforms that are integrated into various social media channels and configured to monitor, manage, discover, and distribute content. They are primarily used by brands/enterprises to manage all of their social channels. Exemplary companies focus on business enterprises and allow marketers to manage their social platforms.

Content tool providers are focused on providing tools for influencers to produce better content, amplify content, or syndicate content to other platforms. Exemplary tools help content creators create videos to an on-line posting service and then splice portions of that video to other online platforms or social media networks.

There are Multi-Channel Networks (MCNs) that play the role of modern broadcasters. Brands use them because they want the MCN to connect them with the right influencer and create full authentic stories that have the voice of the influencer. Influencers use them to make money and produce content. Exemplary MCNs act as full-service agencies as well as network studios. An MCN may be considered to be a combination of an ad agency, content ad network, a television studio, influencer analytics, and a roster of influencers.

Social media networks include platforms such as FACEBOOK®, TWITTER®, INSTAGRAM®, YOUTUBE®, and SNAPCHAT®. FACEBOOK® is currently promoting Video and Mentions, two products that have the potential to change how influencers look at the platform for influence. TWITTER® is popular for influencers who have text-based messages. INSTAGRAM® is one of the leading mobile influencer platforms to share/discover images. INSTAGRAM® has a video product, but most influencers use INSTAGRAM® for pictures. YOUTUBE® is the largest video platform, and it pays its influencers through advertising. Influencers use the YOUTUBE® Analytics Platform to develop titles, thumbnails, descriptions, and keywords. There is a substantial amount of metadata that needs to be completed for a YOUTUBE® video to be successful. Sophisticated YOUTUBE® users, or YouTubers AB test their thumbnails and content by advertising on FACEBOOK® before publishing on YOUTUBE®. Users of SNAPCHAT®, also known as Snappers, share accounts, do 'takeovers', and publish stories. Some Snappers are paid with SNAPCASH®, mostly by brands that want to user the medium as television. In addition to the influencer itself, other stakeholders include the talent agencies, the brands, and the brand agencies. Talent agencies largely act as gatekeepers to the influencers, their content, and their audience.

Given the complexity of the social media marketing ecosystem, there remains a need for an integrated technology platform that can enable a private marketplace and provide a self-serve dashboard configured to empower a brand and social media influencer to directly connect with each other. There also remains a need for workflow tools to improve the management of talent. There further remains a need for social media influencer marketing platforms that manage influencer relationships and marketing campaigns from end-to-end, offer less reliance on middlemen and their experience, and provide a broader, more-integrated set of tools to connect the needs to brands, agencies, influencers, and the audience. Finally, there remains a need for an integrated platform that enables an advertising party to find social media influencers who are most suited to the brands' contexts, market appeal, and demographic targets, helps build and manage relationships with the influencers, and identifies fake influencers. There is thus a need for an improved integrated platform that offers administration and interaction of various stakeholders involved with influencer marketing.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a method of using a software platform configured to enable a first user to engage with at least one second user in order to generate content targeted towards users of one or more social media networks, the method being implemented by at least one server executing a plurality of programmatic instructions and comprising: generating data indicative of a first graphical user interface, wherein the first graphical user interface, when displayed on a computing device associated with the first user, enables the first user to input at least one of a plurality of criteria indicative of a desirable second user; based on data received from the first user via the first graphical user interface, identifying the at least one second user and generating data indicative of the at least one second user; enabling the first user to issue a request to the at least one second user for a project designed to generate the content for distribution in the one or more social media networks; generating data indicative of a second graphical user interface, wherein the second graphical user interface, when displayed on a computing device associated with the at least one second user, enables the at least one second user to receive the request; generating data indicative of a third graphical user interface, wherein the third graphical user interface, when displayed on the computing device associated with the at least one second user, enables the at least one second user to submit a proposal in response to the request; receiving an indication that the proposal is accepted by the first user; in response to the indication, configuring the proposal into a blockchain data structure; receiving a first set of data from the first user, wherein the first set of data is responsive to the proposal and responsive to the blockchain data structure; receiving a second set of data from the at least one second user, wherein the second set of data is responsive to the proposal and responsive to the blockchain data structure; enabling the at least one second user to communicate the content to the first user for approval, wherein the content is in a first format; and providing access to one or more resources to the at least one second user based on the blockchain data structure.

Optionally, the plurality of criteria includes at least one of, two of, three of, four of, five of, six of, seven of, eight of, nine of, ten of, eleven of, twelve of, thirteen of, or fourteen of brand affinity, personality archetype, content topic, gender, age, location, language, ethnicity, religion, income, interest, occupation, sentiment and hashtag.

Optionally, the proposal comprises data indicative of at least one of a scope of work, milestones, evaluation metrics or penalties for late or poor work delivery.

Optionally, the content is configured to be distributed in the one or more social media networks in a second format and wherein the second format has a higher resolution than the first format.

Optionally, the first format comprises a visible watermark obstructing at least part of one or more frames or images of the content.

Optionally, the method further comprises, after providing access to the one or more resources, providing access to the content in a second format to the first user, wherein the second format has at least one of a higher resolution, a less visible watermark, or less noise than the content in the first format. The method may further comprise distributing the content in the second format to the users of one or more social media networks. The method may further comprise, prior to said distributing, applying a machine learning model to the content in the second format to identify restricted portions of the content.

The present specification also discloses a method of training at least one machine learning model to classify one or more activities of a plurality of users of a social network as being fake, the method being implemented by at least one server executing a plurality of programmatic instructions and comprising: storing, in at least one database coupled to the at least one server, a first labeled dataset of a first plurality of creators and a second labeled dataset of a second plurality of creators; identifying a first plurality of features in the first labeled dataset and a second plurality of features in the second labeled datasets; identifying a third feature with reference to the first labeled dataset and the second labeled dataset; providing to the at least one machine learning model data from the first labeled dataset and second labeled dataset for training, wherein the at least one machine learning model is configured to use the first plurality of features, the second plurality of features, and the third feature to generate an output classifying said data as fake or non-fake; determining, for each data, an error between the output generated by the at least one machine learning model and a known output; performing back propagation, by the at least one machine learning model, based on the error to correct one or more parameters of the at least one machine learning module; determining a first metric, a second metric and a third metric to validate a quality of the output generated by the at least one machine learning model; and stopping the training if the first metric, second metric and third metric achieve a first predefined value, a second predefined value and a third predefined value, respectively.

Optionally, the first labeled dataset includes data indicative of profiles and posts of the first plurality of creators characterized by fake activity, and wherein the second labeled dataset includes data indicative of profiles and posts of the second plurality of creators characterized by non-fake activity. Optionally, each of the second plurality of creators is characterized by having less than a predefined threshold number of followers. Optionally, the first labeled dataset includes a portion of the first plurality of creators characterized by having bought followers and a second portion of a portion of the first plurality of creators characterized by having bought likes.

Optionally, the first plurality of features includes data indicative of at least one of, two of, three of, four of, five of, six of, seven of, eight of, nine of, ten of, eleven of, twelve of, thirteen of, or fourteen of a ratio of a value indicative of a number of followers count to a value indicative of a number of persons followed, a length of description, a length of a full name, a length of a username, a difference between the full name length and the username length, a number of digits in the username, a value indicative of a number of posts relative to a number of followers, and a value indicative of a number of posts relative to number of persons being followed. Optionally, the second plurality of features comprises at least one of data indicative of a distribution of a number of likes and comments on posts or a frequency of publications using one or more statistical characteristics.

Optionally, the third feature is a function or ratio of a number of the first plurality of creators in the first labeled dataset and a number of the second plurality of creators in the second labeled dataset.

Optionally, the first metric corresponds to precision, the second metric corresponds to recall and the third metric corresponds to a value indicative of how well the machine learning model has learned to separate fake creators from non-fake creators.

Optionally, the first value corresponding to the first metric has a value in a range of 0.1 to 0.9, the second value corresponding to the second metric has a value in a range of is 0.1 to 0.9 and the third value corresponding to the third metric has a value in a range of is 0.1 to 0.9. Optionally, the first value corresponding to the first metric has a value of 0.75, the second value corresponding to the second metric has a value of is 0.7 and the third value corresponding to the third metric has a value in a range of 0.75.

Optionally, the output corresponds to classifying at least one of the first plurality of creators in one of low risk, average risk, high risk or very high risk group based on a percentage of posts associated with the at least one of the first plurality of creators identified as fake.

The present specification also discloses a system for determining activity of a creator as fake on at least one social media network, wherein the system comprises a plurality of programmatic instructions that, when executed by at least one processor: execute a first machine learning model configured to receive, as inputs, data associated with followers of the creator and predict, as outputs, bought followers by estimating values of a first plurality of features; and execute a second machine learning model configured to receive, as inputs, data associated with the creator and predict, as output, bought likes by estimating values of a second plurality of features, wherein activities of the creator are determined to be fake based on the estimated values of the first plurality of features and/or the estimated values of the second plurality of features.

Optionally, activities of the creator are determined to be fake if the estimated values of the first plurality of features and/or the estimated values of the second plurality of features are negative.

Optionally, the first plurality of features is based on profile information of the creator.

Optionally, the first plurality of features comprise at least one of a ratio of a number of individuals are following the creator relative to a number of individuals that are being followed by the creator, a length of description, a username, a full name, differences between the full name and the username, a number of digits in the username, a function of a number of posts to the number of individuals who are following the creator, or a function of the number of posts to the number of individuals who being following by the creator.

Optionally, the second plurality of features are derived from information indicative of posts of the creator.

Optionally, the second plurality of features comprise at least one of a mean of a number of likes or comments on posts of the creator to the at least one social media network, a median of the number of likes or comments on the posts of the creator to the at least one social media network, or deviations of a distribution of the number of likes or comments on the posts of the creator to the at least one social media network.

Optionally, the second plurality of features comprise at least one of a mean of a frequency of posting by the creator to the at least one social media network, a median of a frequency of posting by the creator to the at least one social media network, or deviations of a distribution of frequencies of posting by the creator to the at least one social media network.

Optionally, the validation of the first machine learning model and the second machine learning model are determined by computing areas under receiver operating characteristic curve score, precision and/or recall metrics. The system may further comprises modulating the precision metric to be higher with a lower recall metric or to be lower with a higher recall metric based on a desired level of accuracy for the first machine learning model or second machine learning model predictions of fake activity or non-fake activity.

Optionally, the estimated values of the first plurality of features and second plurality of features are Shapley values.

The present specification also discloses a method of enabling a marketer to engage with at least one content creator for generating content associated with a marketing campaign being targeted towards users of one or more social media channels, the method being implemented by at least one server executing a plurality of programmatic instructions and comprising: generating a first graphical user interface on the marketer's computing device to enable the marketer to search one or more content creators based on at least one of a plurality of criteria; presenting, on the first graphical user interface, a list of search content creators; selecting, using the first graphical user interface, said at least one content creator for a content creation project corresponding to the marketing campaign; enabling the marketer to issue a bid request to said at least one content creator for the content creation project; generating a second graphical user interface on the creator's computing device to enable the at least one content creator to receive the bid request; generating a third graphical user interface on the at least one content creator's computing device to enable the at least one content creator to submit a content creation proposal in response to the received bid request; configuring the content creation proposal into a smart contact based on blockchain, the smart contract being generated after finalization of the content creation proposal between the marketer and the at least one content creator; enabling the marketer to deposit funds in an escrow account based on the smart contract; enabling the at least one content creator to communicate the content to the marketer for approval, wherein the content is in a first format; and releasing at least a portion of the funds from the escrow account to the at least one content creator based on fulfillment of at least a portion of the smart contract.

The aforementioned and other embodiments of the present specification shall be described in greater depth in the drawings and detailed description provided below.

BRIEF DESCRIPTION OF THE DRAWINGS

These and other features and advantages of the present specification will be further appreciated, as they become better understood by reference to the following detailed description when considered in connection with the accompanying drawings:

FIG. 1A is a block diagram illustration of a high-level architecture of a system for implementing an influencer marketing management platform, in accordance with some embodiments of the present specification;

FIG. 1B is a block diagram of a high-level architecture of the influencer marketing management platform, in accordance with some embodiments of the present specification;

FIG. 3A illustrates a weekly observation of a video blog posted by a creator;

FIG. 3B illustrates a display of the posts posted by creators that solicited the most engagements from an audience;

FIG. 3C illustrates an exemplary report on the demographics of audience that have engaged with a certain post/content;

FIG. 3D illustrates a post that received the most views, and a post that was most reposted;

FIG. 7 is an exemplary GUI that a marketer may use to search, sort and filter influencers based on a plurality of criteria, in accordance with some embodiments of the present specification;

FIG. 8 illustrates data corresponding to an exemplary content creation proposal between a marketer and a creator that has been agreed upon and finalized, in accordance with some embodiments of the present specification;

DETAILED DESCRIPTION

Figure 2:
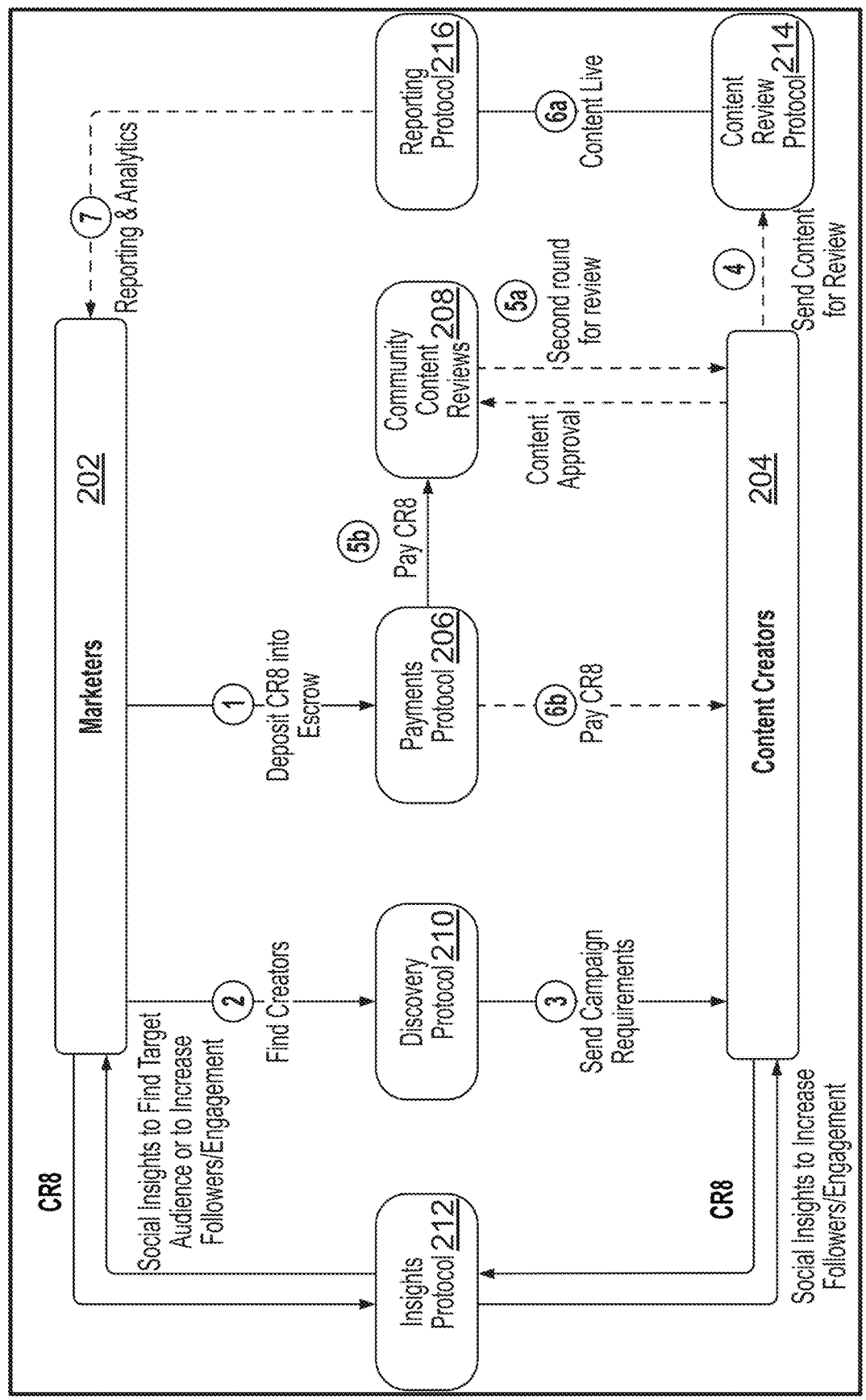
FIG. 2 illustrates an exemplary workflow of a marketing campaign within a platform in accordance with some embodiments of the present specification.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

In various embodiments, the system includes at least one processor capable of processing programmatic instructions, has a memory capable of storing programmatic instructions, and employs software comprised of a plurality of programmatic instructions for performing the processes described herein. In embodiments, a computer-readable non-transitory medium comprises the plurality of executable programmatic instructions. In one embodiment, the at least one processor is a computing device capable of receiving, executing, and transmitting a plurality of programmatic instructions stored on a volatile or non-volatile computer readable medium.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In alternate embodiments, hard-wired circuitry may be used in place of, or in combination with, software instructions for implementation of the processes of systems and methods described in this application. Thus, the systems and methods described are not limited to any specific combination of hardware and software.

Definitions

'Admin Panel' refers to unified online system, providing management and administration capabilities for the platforms in accordance with the present specification.

"Social media influencer", "influencer", or "creator" refers to an individual that creates content and has a following that engages with that content. This individual has typically achieved a threshold number of followers or subscribers on one or more social media platforms and whose followers or subscribers have demonstrated a threshold amount of engagement with the posts, videos, pictures, tweets, or other content created by the social media influencer. In one embodiment, the threshold number of followers or subscribers is at least 10,000.

'Marketers' or 'marketer' refers to any brand, business, or enterprise company that utilizes content at scale such as for digital marketing campaigns on social media platforms and online communities.

'Community content viewers' refer to individuals on the influencer marketing management platform described in the present specification who may help review content for errors or other anomalies.

'Influencer marketplace' refers to a website or on-line service that allows a user to search for one or more social media influencers based on a range of customizable criteria and facilitate transactions between social media influencers and third parties (i.e. advertisers or brands).

'Tracker' refers to an identifier of an element that is being tracked by the platform in accordance with the embodiments of the present specification. The elements include a social media account, social media hashtag, location, user identifiers or profile data, content identifiers, other related or associated elements, timelines, status, favorites, display format, among other data.

'Collection' refers to an assembly of trackers grouped together. Collections are unique on an ID basis (different collections can have the same name) and can be shared among members of the same group of users.

'User' refers to a person using the platform in accordance with the various embodiments of the present specification, as a client under one of the available paid subscription plans.

'Team' refers to a group of users under the same plan or associated account, who share the same trackers, but who may use a separate set of logins/passwords. Users registering as a team may follow a separate account registration procedure.

'Internal Messaging System' refers to an interface that provides means for various user types, such as a operations, advertisers or brands, and social media influencers or creators, to communicate with each other by composing, sending and receiving text messages (hereunto IM messages) from within the platform.

The term "social media", "social media network", or "social media channels" refers to a plurality of online accessible datasets configured to be displayed in graphical, video, audio, or textual form, wherein each of the plurality of online accessible datasets is associated with a specific user, wherein the ability to access or interact with a given one of the plurality of online accessible datasets is at least partially controlled by the specific user associated with that one of the plurality of online accessible datasets, and wherein the ability to access or interact with any of the plurality of online accessible datasets is also at least partially controlled by a single administrative entity.

The term "server" used in this specification should be understood to refer to a service point which provides processing, database, and communication facilities. As such, therefore, the term "server" may refer to a single, physical processor with associated communications and data storage and database facilities, or it may refer to a networked or clustered complex of processors and associated network and storage devices, as well as operating software and one or more database systems and applications software which support the services provided by the server.

The term "engine or module" used in this specification may refer to computer logic utilized to provide a desired functionality, service or operation by programming or controlling a general purpose processor. In various embodiments, a module can be implemented in hardware, firmware, software or any combination thereof. The module may be interchangeably used with unit, logic, logical block, component, or circuit, for example. The module may be the minimum unit, or part thereof, which performs one or more particular functions.

Embodiments of the present specification provide an influencer marketing platform that integrates the needs of multiple stakeholders involved in an influencer marketing process, particularly including—the influencers, the talent agencies, the brands, the brand agencies, among others. The platform provides an integrated method for managing marketing campaigns while discovering and engaging content creators and communities; and tools for reviewing, analyzing, and reporting.

FIG. 1A is a block diagram illustration of a high level architecture of a system 100 for implementing an influencer marketing management platform 101, in accordance with some embodiments of the present specification. The system 100 comprises at least one server 102 in data communication, via a network 120, with at least one administrator using a computing device 107, one or more marketers using their corresponding computing devices 110 and one or more influencers using their corresponding computing devices 115. The at least one server 102 is in data communication with at least one database system 105.

For the purposes of the present specification an 'administrator' refers to a person/operator or an entity (such as, a company, organization, agency, agent, or representative) who is responsible for the overall operation, maintenance and services of the platform 101, while a 'marketer' refers to a person or an entity (such as, for example, a brand, company, organization, agency, agent or representative) desirous of discovering, recruiting and engaging one or more creators to assist in implementing an online marketing campaign via a social network or an online community, for example. The present specification also generically refers to the marketers and creators as 'users' since both entities are end-users of the functionalities, features and services enabled and offered by the platform 101.

In various embodiments, the computing devices 107, 110, 115 are configured to receive inputs from the administrator, marketers and creators, respectively, generating requests to the platform 101 as well as transmitting to and/or receiving data from the platform 101 via the network 120. In one embodiment, the computing devices 107, 110, 115 are conventional computer systems, such as a desktop or a laptop computer. Alternatively, the computing devices 107, 110, 115 may be devices having computer functionality, such as a personal digital assistant (PDA), a mobile telephone, or a smartphone. In one embodiment, the computing devices 107, 110, 115 execute a client-side module, engine or application allowing the administrator, marketers and creators to interact with the platform 101. For example, the computing devices 107, 110, 115 may execute a browser application, or an application designed specifically for interaction with the platform 101, to enable interaction between the computing devices 107, 110, 115 and the platform 101 via the network 120. In another embodiment, the computing devices 107, 110, 115 interact with the platform 101 through an application programming interface (API) running on a native operating system of the computing devices 107, 110, 115, such as IOS® or ANDROID®.

In accordance with aspects of the present specification, the at least one server 102 implements the platform 101. In some embodiments, the functionalities, features and services of the platform 101 are available to the users as a cloud based service. In some embodiments, the at least one server 102 hosts a website (hereinafter referred to as an 'influencer marketplace') to enable the administrator and the users to register, login and access the functionalities, features and services of the platform 101 using their respective computing devices.

During operation, a marketer may use his computing device 110 to access the influencer marketplace, register and enter into a subscription or payment model with the platform 101, utilize a plurality of functionalities, features and services of the platform 101 to create/design a marketing and advertising campaign (including textual, audio and/or video content), discover or search desired creators using a plurality of filters, criteria and conditions, engage and communicate with the selected/approved creators to launch the marketing and advertising campaign across a plurality of social networks and/or online communities to which the selected creators are associated with and monitor effectiveness or performance (by way of a plurality of statistics, metrics and analytics) of the creators as well as the marketing and advertising campaign across the plurality of social networks and/or online communities.

Similarly, a creator may use his computing device 115 to access the influencer marketplace, register and enter into a subscription or payment model with the platform 101, utilize the plurality of functionalities, features and services of the platform 101 to create/design a marketing and advertising campaign in embodiments where the marketer would enlist the creator's expertise to generate content for the campaign (instead of or in addition to providing base content or requirement/specifications for the campaign), engage and communicate with marketers to finalize content for the campaign and monitor effectiveness or performance of the marketing and advertising campaign (by way of a plurality of statistics, metrics and analytics) across a plurality of social networks and/or online communities that are targeted by the creator for launching or implementing the campaign.

Also, an administrator may use his computing device 107 to perform a plurality of operation and maintenance functions pertaining to the platform 101 and as described further in this specification with reference to functionalities, features and services enabled by various modules of the platform 101.

In embodiments, the at least one database system 105 implements a plurality of database engines to support storage, analysis, and reporting of different types of data collected through the platform 101. Some exemplary database engines used by embodiments of the present specification may include MARIADB®, REDIS®, ELASTICSEARCH®, and HBASE®. In embodiments, MARIADB® may be used for data pertaining to user common data, teams, creator data, campaign data, campaign report data, talent lists, access control policies, and content workflow. In embodiments, REDIS® may be used for caching campaign reports, talent lists, access control policies, access token, and other forms of data. In embodiments, ELASTICSEARCH® may be used for data pertaining to creator profiles. In embodiments, HBASE® may be used for data pertaining to social networks, campaign posts, analytics, and creator trackers.

As shown in FIG. 1B, in some embodiments, the platform 101 comprises a dashboard engine or module 130, a user and team management engine or module 132, a messaging engine or module 134, an analytics engine or module 136, a discovery engine or module 138, a campaigns engine or module 140, a user registration engine or module 142, a fake detection engine or module 144, a payments/subscription engine or module 146, a web crawler module 148, a content review engine or module 150, and a reward and recognition engine or module 152.

In embodiments, the plurality of functionalities, features and services offered by the platform 101 are enabled by the engines or modules 130, 132, 134, 136, 138, 140, 142, 144, 146, 148, 150 and 152 as described henceforth in this specification.

Dashboard Engine or Module 130

The administrator uses his client device 107 to send a request to the at least one server 102 to view an administrator dashboard (also referred to as an 'Admin Panel'). The administrator's request is serviced by the dashboard engine or module 130 that executes a plurality of programmatic instructions or code to generate at least one dashboard GUI (Graphical User Interface) for display on the administrator's client device 107. The at least one dashboard GUI provides a bird's eye view of the system 100 and provides the following sections/areas, functionalities, utilities and information:

An area with a selection of infrastructure status indicators from a Health-status section
    Display of bandwidth used by the system 100 over a period of time
    Expandable list of top 10 trackers, ranked by reach
    Expandable List of top 10 collections, ranked by number of users using the collection
    List of top 10 teams, ranked by number of members
    10 recently added user(s) along with their subscription plans
    A graph showing change in number of trackers over time
    A graph showing change in number of subscribed users over time
    System-wide notifications (such as, but not limited to, user alerts)

The health-status section provides the following information:
    InData status
        Crawler status (online/offline), uptime
        Database status (online/offline), uptime
        API availability (online/offline), uptime
    Insights
        Website (online/offline), uptime
        API Availability (online/offline), uptime
        API Average response time
    Marketplace
        Website (online/offline), uptime
        API availability
    Main Captiv8.io web-site
        Website (online/offline), uptime
    Public leaderboard—provides display of user and brands information, ranked according to key performance indicators.

Trackers

The administrator can use the dashboard to view a web page that provides a list of trackers in a tabled format with the following columns:
    Tracker type (INSTAGRAM®, #hashtag, etc.)
    Channel (Social network)
    Name
    Time created
    Status (active/suspended)
    Volume (Reach)
    Number of users using the tracker
    Number of teams using the tracker
    Number of lists (collections) the tracker appears in The list of trackers can be edited or deleted by the administrator. In embodiments, the list of trackers displayable can be filtered by channel, type, status, and sorted by any column. The web page also features an 'Add tracker' button/icon that the administrator can actuate to add one or more trackers. The web page further features a 'create collection' button/icon that the administrator can actuate to add a new collection based on the selected trackers.

Tracker Management

The administrator can click on a tracker (from the list of trackers) to view an individual tracker GUI with a more detailed display of data pertaining to the selected tracker, with options to re-launch and/or delete the tracker. Data elements displayed include:
- Volume (Audience reach)
- Social channel (i.e. TWITTER®, INSTAGRAM® etc.)
- Status (active/inactive)—active status implies that the tracker is being constantly monitored, with relative data aggregated daily.
- Cost
- Number of users—number of users using the tracker
- An expandable table of users who are using the tracker, displaying user login, plan and team
- An expandable table of teams using the tracker, showing team billing plan and number of members
    - An expandable table of collections containing the tracker"

The individual tracker GUI includes the following action buttons/icons: add new tracker, re-launch tracker, delete tracker.

Tracker Management Functionalities
- Tracker re-launch—Re-launching a tracker erases all non-historic data previously aggregated for that tracker to date. Non-historic data implies all data which is not available upon request via a social network's API and is collected by Insights crawlers (i.e. follower fluctuation statistics). Tracker re-launched is applied globally, meaning the metrics change affects all users. Appropriate notification is sent to all users "subscribed" to the tracker upon re-launch.
- Tracker Suspension—Implies that the tracker is not being monitored and information pertaining to the tracker is not being aggregated. Suspended status is applied to the tracker globally, meaning, that it becomes suspended for all users of the system.
- Delete Tracker—Removes tracker from the system, globally for all users.

With regards to all tracker-related user actions, such as deletion, notifications are displayed to confirm administrator's intentions.

Collections

The administrator can use the dashboard to view a collections web page that provides a list of tracker collections in a tabled format with the following columns:
- Collection Name
- Creator
- Time created
- Volume (Audience reach)
- Number of users using the collection
- Number of teams using the collection
- Number of trackers included
- Actions—the administrator is allowed to delete a collection after administrator confirms his/her intent.

The collections web page also enables following functionalities for the administrator:
- Search for collection by name element—triggers a name-based search and displays all matching collections.
- Create collection button—creates an new empty collection for user to add trackers to.

Collection Management

The administrator can click on a collection (from the list of tracker collections) to view an individual collection GUI with a more detailed display of data pertaining to the selected collection, as follows:
- Collection name
- Creator
- Date created
- Channels (Social media channels)
- Volume (Cumulative audience reach, based on all trackers comprising a collection)

A table with a list of trackers, included in the collection, with the following columns:
- Type (social media account, hashtag)
- Channel (social media channel)
- Tracker name
- Time created
- Status (active/suspended)
- Volume (Audience reach)
- Actions—the administrator is allowed to remove a tracker from a collection only. However, the removed tracker still remains in the system.

A table listing users who have access to the collection with the following columns:
- Email
- # of trackers
- Billing Plan
- Team name (if any)
- Actions—the administrator is allowed to:
    - Share with users—share collection with one or more additional users, adding them to the list.
    - Remove selected users from list—hide and make collection inaccessible for selected users.

A table displaying a list of teams with the following columns:
- Name
- # of members
- Team billing plan
- Actions—the administrator is allowed to:
    - remove one or more teams from the list of teams
    - Share with teams—share collection access with additional teams, thus adding them to the list.
    - Remove selected users from list—hide and make collection inaccessible for selected teams.

The administrator is provided with the following collection-wide actions:
- Rename collection
- Delete collection—Deletes a collection as an entity, leaving the trackers intact. The collection is removed for all users and teams.
- Pause/resume all trackers within the collection
- Restart all trackers within the collection In embodiments, team members can share access to their collections with any member of the team. Also, the administrator can give any user access to any collection.

User and Team Management Engine or Module 132

User Management

The administrator uses his client device 107 to send a request to the at least one server 102 to manage one or more users. The administrator's request is serviced by the user management engine or module 132 that executes a plurality of programmatic instructions or code to generate at least one user and team management GUI (Graphical User Interface) for display on the administrator's client device 107. A first user and team management GUI provides a list of users in a sortable table with the following columns:
- Email
- Number of trackers
- Total volume
- Team (if any)
- Paid or Trial (Billing plan)
- Date created
- Role
- Status (If trial ended)
- Link to user details In embodiments, the list of users can be searched by email, user's social accounts, connected to the Insights panel, team name. The administrator can perform following actions on the GUI displaying the list of users:

Actions
- Add new user
- Delete selected user

User Details (Individual User Profile Management)

The administrator can click on a user (from the list of users) to view an individual user GUI with a more detailed display of data pertaining to the selected user along with a management interface to change/update the user's details, permissions/privileges and usage limitations, as follows:

User's personal details (Name, Email etc.)
Role
- Full-fledge User/Groups functionality with permission settings.
- Superuser feature.
- Superuser can create arbitrary number of groups, each group have a unique set of access permissions.

User's connected accounts (Social network accounts)
- Channel
- Username
- Actions—The administrator can remove the user's connected accounts from the system User's teams (List of teams user belongs to, if any)
- Name (link to team's details)
- Number of members
- Team billing plan
- Actions—remove or add new User's collections—provides a table displaying a user's collections with the following columns:
- Name (link to collection's details)
- Volume
- Status
- Actions—remove or add new User's billing (stripe account if exists) and permissions (volume, allowed reports, allowed features, such as export, type of trackers, deletions)

User's trackers
- Name
- Volume
- Status
- Actions—remove a tracker or add a new tracker Following are additional actions or functionalities available to the administrator:
- Impersonate (sign in as this user)
- Edit email
- Edit permissions and trial period
  - Edit volume
  - Edit allowed reports number
  - Edit max # of trackers per report
  - Edit allowed deletions per month number
  - Allow/disable historical data
  - Edit trial period
  - Allow/disable hashtag trackers
  - Allow/disable location trackers
  - Allow/disable comparison report
  - Allow/disable export
- Edit trackers (single section)
- Edit associated teams (single section)
- Edit associated collections (single section)
- Remove account (cancel membership)
- Suspend account
- Edit connected social network accounts Team Management A second user and team management GUI provides a list of teams in a sortable table with the following columns:
- Name
- Auth URL
- # of users
- Total volume
- Plan
- Owner (link to user's details)
- Link to team details
- Actions—the administrator is allowed to add new team or delete a selected team In embodiments, the list of teams can be searched by name and plan, for example.

Team Details (Individual Team Management)

The administrator can click on a team (from the list of teams) to view an individual team GUI with a more detailed display of data pertaining to the selected team along with a management interface to change/update the team's details, permissions/privileges and usage limitations, as follows:

Team's details (Name, Email etc., domain)
- List of users
- E-mail
- Name
- Team (can be multiple)
- Status
- Actions
  - Edit custom permissions (such as volume, max #trackers)
  - Remove
  - Add new Team's collections (Table displaying team's collections)
- Name (link to collection's details)
- Volume
- Status
- Actions
  - Remove
  - Add new Team billing (stripe account if exists) and permissions (volume, allowed reports, allowed features, such as export, type of trackers, deletions)

Team trackers
- Name
- Volume
- Status
- Actions
  - Remove a tracker
  - Add new tracker Following are additional actions or functionalities available to the administrator:
- Edit name
- Edit domain name
- Edit permissions and trial period
  - Edit volume
  - Edit allowed reports number
  - Edit max # of trackers per report
  - Edit allowed deletions per month number
  - Allow/disable historical data
  - Edit trial period
  - Allow/disable hashtag trackers
  - Allow/disable location trackers
  - Allow/disable comparison report
  - Allow/disable export
  - Edit max users
- Edit associated trackers (single section)
- Edit associated users (single section)
- Edit associated collections (single section)

Remove team (Cancel membership)

Suspend account

Functionalities—full-fledge User/Groups functionality with permission settings

Super-user feature

Super-user can create arbitrary number of groups, each group have a unique set of access permissions.

Messaging Engine or Module 134

The messaging engine or module 134 executes a plurality of programmatic instructions or code to generate one or more messaging GUIs and enable text based communication amongst users of the system 100 subject to the following functionalities, features and conditions:

Communication is enabled only between users belonging to different groups. For example, a creator is not enabled to message another creator, while a marketer can send a message to a creator. However, the administrator can message anyone.

Communication threads feature is enabled so as to display a message that includes a running list of all the succeeding replies starting with the original message. The replies are arranged visually near the original message and displayed vertically in chronological order from the first reply to the most recent being on top of the message page.

Contacting directly by email whereby the administrator can use his dashboard GUI to contact a creator by sending a text message to the creator's email address and/or to the creator's phone (via SMS).

Broadcast messaging whereby the administrator can use his dashboard GUI to send out emails, in bulk, to all creators' respected email addresses.

All message GUI whereby the administrator can use his dashboard GUI to view an all message GUI that provides a tabled list of all messages sent back and forth between users, including broadcasted and direct messages (marked accordingly) with expandable rows for threaded messages. The tabled list of all messages includes the columns—from, to (username/email, SMS (for direct messages)/Broadcast (for broadcast messages) and date sent.

Analytics (Insights) Engine or Module 136

The analytics engine or module 136 executes a plurality of programmatic instructions or code to generate one or more analytics GUIs and enable the following functionalities, features and services:

Location based trackers—this feature enables a user to use any geographical location (i.e. State, City, Country) as a tracker across multiple social networks, with the exception to social networks that do not provide geographical information (i.e. YOUTUBE®. The feature also supports FOURSQUARE® ID and FACEBOOK® places."

Tracker comparison—this feature enables a user to view, on a GUI, an aggregated display of multiple trackers' details in a table format.

Audience ethnicity—this feature enables a user to view, on a GUI, a display of audience ethnicity such as, for example, race and religion.

Audience posts sentiment (e.g. hashtag)—this service enables a user to view, on a GUI, an automated analysis of social posts, based on a method which compares words used in each of the most recent 'n' (say, 'n'=500) posts, against a predefined vocabulary, thus deriving one of the three possible sentiments: positive, negative and neutral. In embodiments, a positive word receives a positive score, a neutral word receives a score of 0 and a negative word receives a negative score. In some embodiments, all scores for each post are then added together, producing a final score used to determine the resulting sentiment. Positive score suggests a positive sentiment, negative and neutral scores—negative and neutral sentiments respectively. In some embodiments, the module 136 also displays a graph showing a distribution, in percentage points, of posts with selected hashtag and their relative sentiment. These fractions are based off the most recent 'n' posts that have been aggregated using the selected hashtag. In embodiments, for video streaming platforms sentiment for each video is analyzed.

Personality analysis—this service applies linguistic analytics and personality theory to infer attributes from a creator's unstructured text. In some embodiments, the personality analysis can be generated by hashtag, comments and ratings. In some embodiments, a web crawler application program (implemented by the web crawler module 148) is used to crawl a user's profile (including hashtag, comments and ratings) to generate the user's personality. In some embodiments, this service is accessible to marketers in order to generate personality analysis of creators. In some embodiments, this service is also accessible to creators in order to generate personality analysis of select audiences.

Photo analysis—this service applies machine learning to tag and classify visual content. In some embodiments, high ranking photos (on a social media channel, for example) are analyzed using this service so that the photos can be indexed and stored in the at least one database system 105 for subsequent searchability.

It should be appreciated that both personality and photo analysis services are accessible to users from the discovery GUIs generated by the discovery engine or module 138 as well as from the analytics GUIs generated by the analytics engine or module 136.

Reports—this service enables users to generate and display a plurality of analytical reports and graphs. In various embodiments, the reports and charts can be exported in CSV and PDF formats with select metrics. In some embodiments, the reports comprise a list of followers and contributors (for hashtag/location trackers).

List management—this service enables a user to:

create a list with trackers set custom list name

Share a list as a public web page or with members of a team

Daily/weekly email digest—this service enables a user to:

Choose how often the module 136 generates and sends (to the user and/or to other parties designated by the user) a digest email such as, for example, daily or weekly Choose for which trackers/list the module 136 should send dynamics/metrics such as, for example:

Total followers (+dynamics by period)

Likes (+dynamics by period)

Posts (+dynamics by period)

Top followers/contributors (if we have access token)

Notify about dashboard status—this service enables the module 136 to send an email and/or SMS to the administrator in the event of critical infrastructure failure (for example, if the database system 105 is down).

Notify about users having high followers—this service an email notification to be automatically sent to the administrator when a new user signs up for the system 100 and connects a social media account with a total reach of 50,000 or more. In some embodiments, the following account details, of the new user, are included in the email notification: full name, social account, total followers, link to profile in the administrator's dashboard and billing plan or trial.

Audience and Engagement Statistics—this service enables marketers to view statistical data that provides insight into the extent of a creator's public outreach, audience profile, including, but not limited to followers' engagement rate, volume, demographics, ethnicity etc. Following are exemplary statistics data that can be viewed for social media channels:

INSTAGRAM®: post, likes, comments, followers, following

TWITTER®: tweets, likes, retweets, followers, following

VINE®: loops, posts, revine, likes, comments, followers, following

YOUTUBE®: videos, likes, dislikes, views, comments, subscribers

Discovery Engine or Module 138

The discovery engine or module 138 executes a plurality of programmatic instructions or code to generate one or more GUIs to enable marketers to search and interact with a database of creators and provide the following functionalities, features and services:

Search—this service includes a collection of customizable search features, allowing marketers to identify desired creators by making data-driven decisions.

Reporting features and ROI (Return On Investment) calculations to enable one to determine the effectiveness of advertising expenditures.

Users/Groups—this service ensures that every user of the system 100, belonging to a separate profile group, has a set of system permissions or privileges.

CRUD (create, read, update and delete)—this functionality allows different category of users to perform storage manipulations (approve/delete users, update details, add new entries etc.).

This is an automated service that identifies creators with high-volume audience (say, for example, 50,000 followers and more) and adds them to a separate list. Such automatically identified creators still show up in the general search and can also be added to arbitrary number of other lists.

Creator's profile—when a marketer has searched and identified a desired creator, the marketer can view (on a GUI) a plurality of details available for the selected creator, including personal information and social statistics data on all trackers pertaining to the creator and creator's audience. In some embodiments, a social table (associated with the identified creator) is displayed to the marketer comprising following exemplary data:

Total reach, engagement, rank among peers in the same interests category, rank among all categories, recent change of reach capacity in percentile relative to historic data (the change is displayed akin to market tickers on stock exchange—green up, red down)

Reach, engagement and rank breakdown across all social platforms that the creator participates in. In some embodiments, the items presented in the list appear descending order based on the total reach.

Audience Graphs: Gender, Age group, Location, Interests, Income (USD), Ethnicity Brands lists: Currently working with, worked with in the past Interests Filters—this feature allows filters to be applied in group and in any order. In embodiments, each time a new filter is applied, and/or a currently enabled filter changed, a new request is generated to the module 138, which in turn queries the at least one database system 105 and returns the results. The content area (that is, the GUI) is updated accordingly, displaying a list of relevant creators. In some embodiments, the query results are updated without reloading the content area/GUI. In some embodiments, a list of currently enabled filters is implemented as a multiple selection list element, appearing above the search results. The aforementioned list is dynamically updated each time an appropriate filter is altered. Tables A and B provide exemplary lists of creator and audience based filters, respectively.

TABLE A

Creator-based filters

| Filter Name | Type | Values | Desription |
|---|---|---|---|
| Availability | Checkbox | Checked/Unchecked | Show only available creators |
| Gender | Toggle Select | Male, Female, Any (default) | Select Creator's gender |
| Age | Dropdowns | Integer values | Represented by two multiple selection elements "from" "to" |
| Ethnicity | Checkboxes | African American, Asian, Hispanic, White/Caucasian | All checkboxes are selected by default |
| Location | Custom options | Any location, Specify | Selection by city/state or country is available when specifying a location |
| Social Platforms | Checkboxes | One for each social platform | At the moment of this writing: INSTAGRAM ® FACEBOOK ®, TWITTER ®, VINE ® |
| Reach | Textbox | Minimum Value of 100,000 | The minimum number of people Creator should have as an audience |
| Engagement Rate | Textbox | Minimum value of 1% | The minimum percentage of audience engagement |
| Parent | Toggle select | Is a parent, Not a parent, Any (default) | Used to filter out creators based on their parent status |
| Ave Post Price | Range | From 0 to 1 Million | Price per post, video or any ther kind of mention |

TABLE B

Audience-based filters

| Filter Name | Type | Values | Description |
|---|---|---|---|
| Gender | Slider | Male toFemale | Essentially a threshold indicating the minimum/maximum percentile of audience of a particular gender |

TABLE B-continued

Audience-based filters

| Filter Name | Type | Values | Description |
| --- | --- | --- | --- |
| Age | Checkboxes | One for each age group | An extra checkbox selecting all age groups |
| Ethnicity | Checkboxes | African American, Asian, Hispanic, White/Caucasian | All checkboxes are selected by default |
| Location | Custom options | Any location, Specify | Selection by city/state or country is available when specifying a location |
| Income | Checkboxes | One for each income group | An extra checkbox to select all income groups |
| Interests | Multiple Selection | Multiple values can be selected | Selection of currently available interest |

Campaigns Engine or Module 140

The campaigns engine or module 140 executes a plurality of programmatic instructions or code to generate one or more GUIs to enable marketers to create, view and manage marketing campaigns. Additionally, the module 140 enables organization of collective efforts, monitoring creators' engagement, audience reactions as well as providing a bird's eye-view of the progress of an entire campaign workflow while providing the following related functionalities, features and services:

Manage campaigns page (Lists campaigns)—this service enables marketers to view, on one or more GUIs, a tabled list of campaigns with the following columns:

Campaign name (clickable link that takes user to campaign management page)
    Number of creators
    Creators participating (clickable profile images)
    Total Reach
    Total Spent
    Total Budget
    Posts count
    Status (Draft, Suspended, Active)
    Campaign Owner (available for teams)
    Audience and engagement dynamics for brand trackers
    Date created In embodiments, the list of campaigns can be filtered by name, social media account of a creator participating in the campaign, Campaign status.

For Individual Campaign Management, marketers can click on a selected campaign, from the list of campaigns, to view detailed information on the campaign, key performance indicators, along with a vertical timeline of key milestones and interactions, outlining the progress. Following are some of the details of a campaign for viewing by the marketers:

Name
    Short description
    Brand
    Budget
    Date range
    Platforms
    Targeting
    Influencers list (if any selected)
        Name
        Contacts
        Status:
            Planned
            Approved
        Actions:
            Remove
            Approve
        Mass actions:
            Share this list (works like a collection)
    Status:
        Draft
        Active
        Archived/Suspended
    Actions:
        Change status
        Delete
        Duplicate
        Edit
    Approved influencer statistics for campaign date range:
        Audience gained/lost
        Engagement numbers and rate
    Posts, comments (if posts are published by approved influencers) and stats:
        Posts content and captions
        Engagement dynamics
        Comments emotions
    @brand or #campaign statistics
        Audience gained/lost
        Engagement Referring to FIG. 14, when the plurality of programmatic instructions are executed, the campaign builder or wizard service module 1400 generates a plurality of graphical user interfaces that provide a marketer with a step-by-step interactive walk-through interface, facilitating campaign creation. In embodiments, a brand or marketer 1402 establishes a smart content/escrow layer 1403 and deposits 1450, into the smart content/escrow layer 1403, a quantity of tokens such as, for example, CR8 tokens, which are configured to enable financial transactions among parties including marketers, content creators/influencers and community content reviewers. The brand or marketer 1402 searches and identifies 1452 a desired creator 1406 for creating content. The creator 1406 and the brand or marketer 1402 may each use their respective CR8 tokens 1404, 1405 to interface with an insights protocol 1414 and receive respective insights data 1408, 1409 from the insights protocol 1414. The insights protocol 1414 is configured to facilitate the exchange of social insights between the brand or marketer 1402 and the creator 1406 in order to increase followers/engagement of the content created by the creator 1406. Content created by the creator 1406 is sent 1454 to a group of community content reviewers 1408 for review. The community content reviewers 1408 receive compensation 1457 for their reviews in the form of CR8 tokens from the smart content/escrow layer 1403. Any errors discovered by the community content reviewers 1408 are sent back 1455 to the creator 1406 for correction.

Once content created by the creator 1406 has been reviewed and approved by the community content reviewers 1408, the creator posts are forwarded 1456 to a reporting protocol 1410. The reporting protocol 1410 performs analytics on the approved posts and sends 1458 the posts to the smart content/escrow layer 1403. The creator 1406 is compensated 1460 with CR8 tokens for posts that have been approved. The smart content/escrow layer 1403 then releases 1462 the created content/posts to the brand 1402.

In embodiments, campaign and content creation follows the following steps:

Step 1: Create campaign—involves at least one GUI with the following exemplary fields to be input by the marketers:
   Name
   Description
   Select existing brand or create new
   Platforms
   Date range (optional)
   Budget range
   Estimated number of influencers (optional)
   Estimated number of posts
   Brand trackers(can be multiple, both @ and #)
     Add tracker by name and type
     Remove
   Targeting:
     Total reach (range)
     Age range (multiselect)
     Gender distribution (male/female proportion)
     Geography (multiselect)
     Interests/categories (multiselect)
     Income (multiselect)
   Actions:
     Set active
     Save as a draft
     Go to step 2

Once a campaign is saved (regardless of the status), its targeting is available in a filter in creator (influencer) search.

In Step 2, creators are selected. Results are generated based on the targeted specifications, however, a user can apply more filters, narrowing the search.
   Targeting conditions
   "Edit targeting" link that goes to step 1
   Budget progress bar (doesn't let select more than budget allows based on planned number of posts in campaign and avg price per post)
   Influencers list (based on targeting conditions):
     Name
     Avg. price
     Engagement rate
     Total reach
     Reach per platform
     Actions:
       Add to campaign/Remove
       Add to favorites In embodiments, the added creators appear on campaign page as 'planned'. In embodiments, the marketers can use the one or more messaging GUIs generated by the messaging engine or module 134 to communicate with creators and mark them as approved when they both have come to terms. In some embodiments, a campaign can be set as Active only if it has at least one approved influencer and none planned. In some embodiments, brand trackers are launched shortly after campaign status is changed to active. In some embodiments, for approved published posts additional data is aggregated.

User (Creators and Marketers) Registration Engine or Module 142

The user registration engine or module 142 executes a plurality of programmatic instructions or code to generate one or more GUIs to enable users (creators and marketers) to register with the platform 101.

In some embodiments, the registration process is split between first and second GUIs wherein the first GUI enables creators to submit personal details while the second GUI enables the creators to connect their social media profiles, specify interests, pricing details and other relevant information.

In embodiments, once the first GUI is filled out, a confirmation email is sent to the signee (in the background) with a link to set their account password. In some embodiments, the second GUI is optional, not required for account registration and can be completed at any time. Nonetheless, having social media accounts connected is imperative for profile efficiency, thus there must be a clear call to action encouraging creators to connect their profiles as soon as possible. In some embodiments, there is a minimum threshold for signee to qualify as a creator, such as at least 5,000 followers, more preferably at least 10,000 followers.

Following is a plurality of basic information to be provided by a creator as a first step:
   First name
   Last name
   Short bio (optional)
   Gender
   Birth date
   Country (selection)
   City
   Street address (optional)
   Phone number (optional)

Following is a plurality of additional information to be provided by a creator as a second step to finalize a public profile:
   Upload picture (optional)
   Authorize accounts (at least one needed to create public profile)
   Post price (user can select one option):
   Average post price per channel and format (e.g. INSTAGRAM® video, INSTAGRAM® photo etc.)
   Average price per any post (only one field)
   My interests (multiple input, 3 minimum)
   Brands I worked with (optional)
   My best promo posts (multiple link input, 3 minimum)
   Channels:
     INSTAGRAM®
     FACEBOOK®
     TWITTER®
     VINE®
     SNAPCHAT®
     YOUTUBE®
   Pricing (appear only for the accounts user authorized)
     INSTAGRAM®
       Photo
       Video
     FACEBOOK®
       Text
       Text with media TWITTER®
  Text
  Text with media
VINE® video
SNAPCHAT® story
YOUTUBE® video In some embodiments, a public profile of a creator displays at least the following information about the creator: name, picture, age, location, reach (total, per social media channel), interests, brands worked with and best promo posts.

In embodiments, the user registration engine or module 142 enables the creators to share their account as a public webpage with at least the following details name, accounts, total reach, reach per platform, audience age and gender, interests, location. In embodiments, the analytics engine or module 136 generates and enables the creators to view their own accounts statistics. In embodiments, the messaging engine or module 134 enables the creators to communicate using text based email and SMS.

Fake Detection Engine or Module 144

Fake or fraudulent activity by a creator may include purchased activity such as, for example, likes, followers, views, impersonating audiences, using false email addresses, and/or falsifying invitations to make it seem as if the creator has a more widely distributed marketing campaign, contrary to the reality. Accordingly, the fake detection module 144 implements a plurality of programmatic instructions or code to determine fake activity of a creator and take remedial measures.

In some embodiments, the module 144 determines fake activity in a set of influencers by a) examining each influencer and determining whether he or she is suspected of fake activity and b) dividing the number of influencers identified as suspicious by the number of all scored users.

In some embodiments, the module 144 is configured to use a first plurality of features/parameters that are based on a creator's profile information and a second plurality of features/parameters that are based on posts' information. In some embodiments, the first plurality of features include metrics such as, but not limited to, ratio of followers to following; lengths of description, username, full name, differences between the full name and the username; number of digits in a username; and ratio of number of posts to followers and following. In some embodiments, the second plurality of features include statistics such as, but not limited to, mean, median, standard and quantiles of a) the distribution of the number of likes and comments on posts, and b) the frequency of publications.

Figure 5:
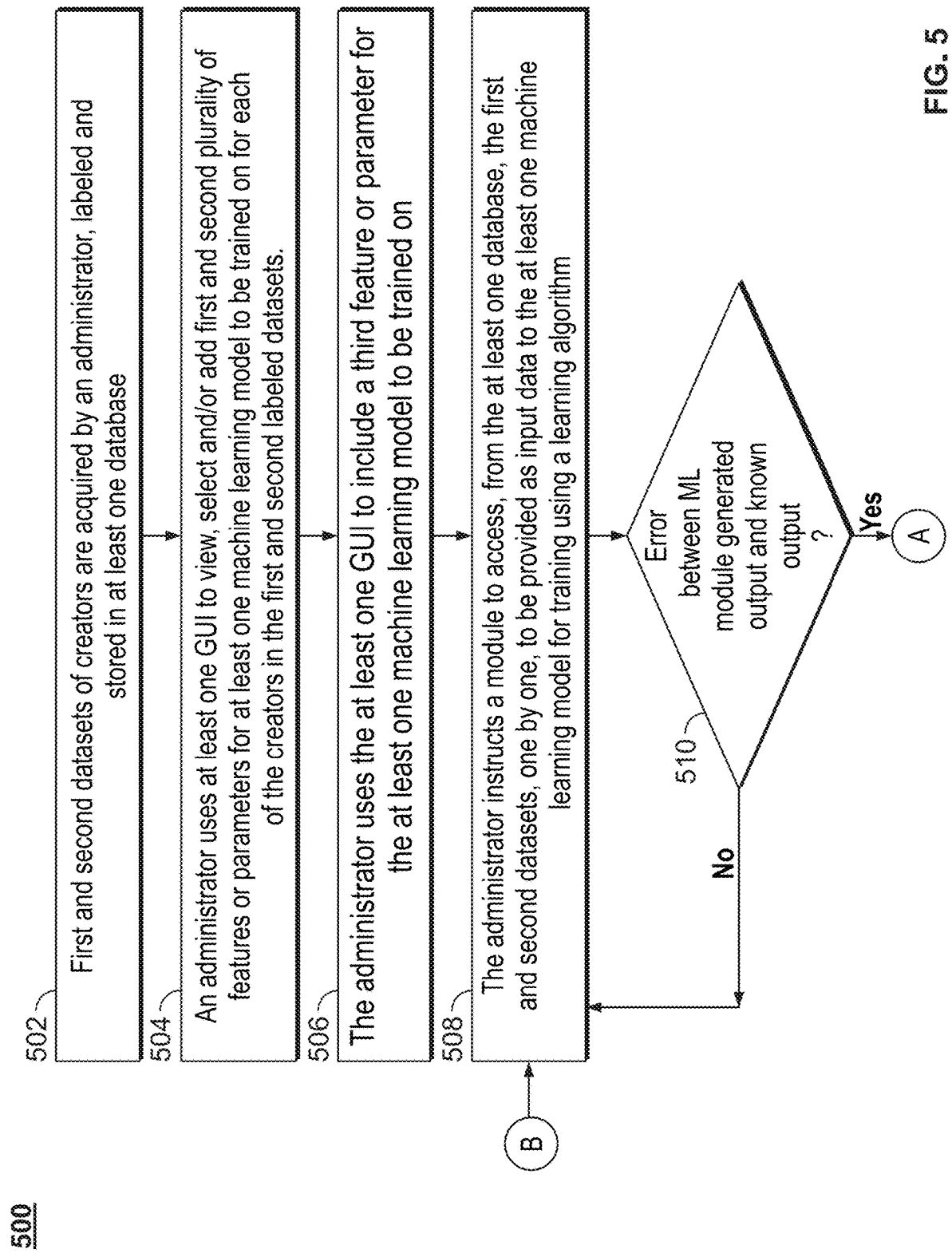
FIG. 5 is a flowchart detailing a plurality of exemplary steps of a method for training at least one machine learning model to identify or classify fake or suspicious creators, in accordance with some embodiments of the present specification.
Figure 5:
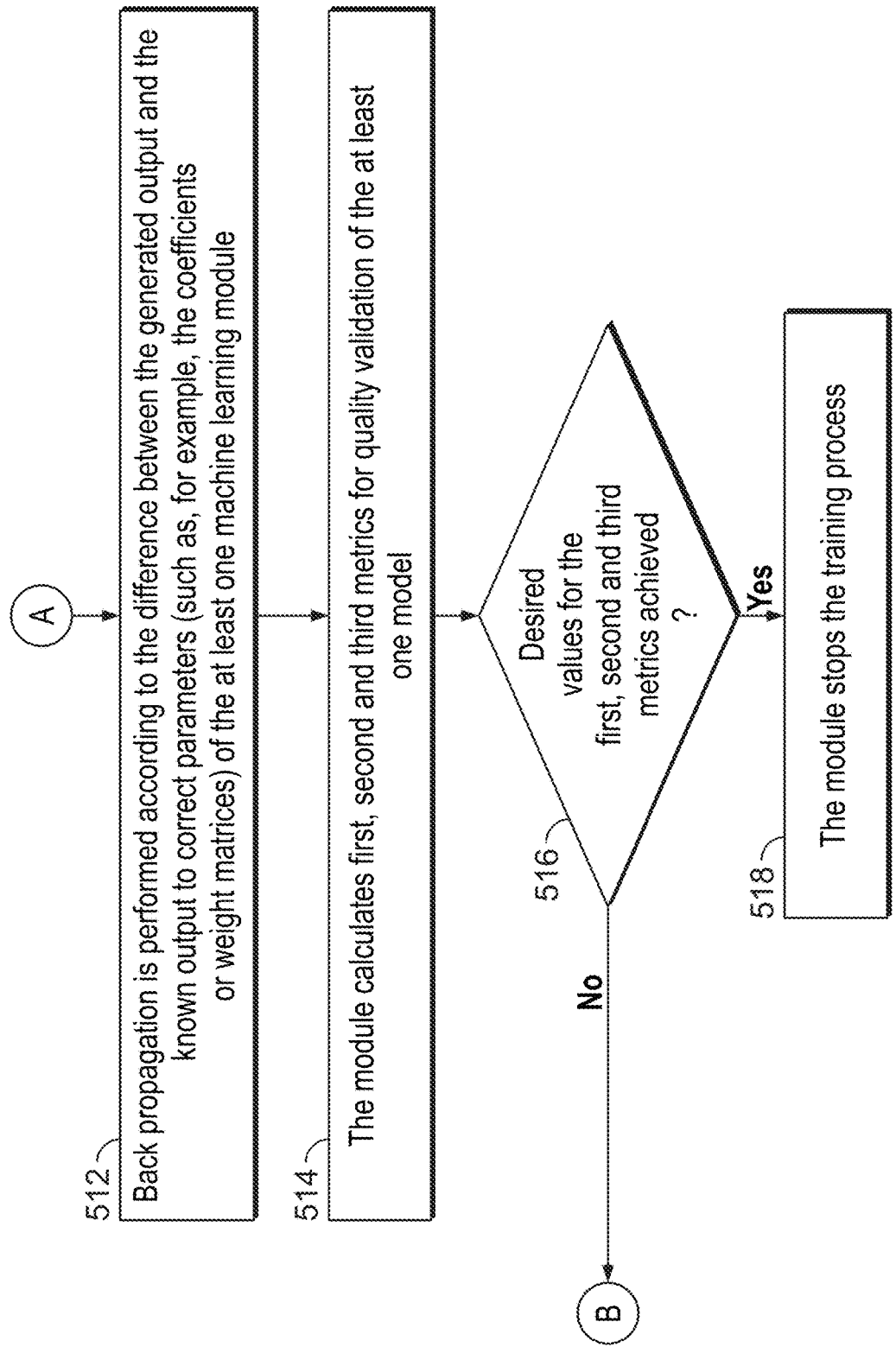

In some embodiments, the module 144 implements a machine learning model that receives, as inputs, data indicative of a profile and posts of a creator or influencer and generates an output identifying or classifying whether the authenticity of the data of the creator or influencer is suspicious and indicative of being fake. FIG. 5 is a flowchart of a plurality of exemplary steps of a method 500 of training at least one machine learning model to identify or classify activities of creators as fake or suspicious, in accordance with some embodiments of the present specification. In some embodiments, the method 500 is implemented by the module 144 in the system 100 of FIG. 1A.

In various embodiments, the at least one machine learning model or artificial neural network comprises one and in some embodiments any two of a deep feed forward network, a perceptron network, a feed forward network, a radial basis network, a recurrent neural network, a long term memory network, a short term memory network, a gated recurrent unit network, an auto encoder network, a variational auto encoder network, a denoising auto encoder network, a sparse auto encoder network, a Markov chain network, a Hopfield network, a Boltzmann machine network, a restricted Boltzmann machine network, a deep belief network, a deep convolutional network, a deconvolutional network, a deep convolutional inverse graphics network, a generated adversarial network, a liquid state machine, an extreme learning machine, an echo state network, a deep residual network, a Kohonen network, a support vector machine network, a neural Turing machine network, or a convolutional neural network with transfer learning network. In some embodiments, the at least one machine learning model is a deep learning feed-forward network such as a multilayer convolutional neural network (CNN).

Referring now to FIGS. 1A, 1B and 5, at step 502, first and second datasets of creators are acquired by an administrator, labeled and stored in the at least one database 105. The first dataset includes profile and posts data of a first plurality of creators characterized by fake activity (of, for example, likes and followers) and this first plurality of creators is labeled as 'fake' creators. The second dataset includes profile and posts data of a second plurality of creators characterized by having less than a predefined threshold number (say, for example, 50,000) of followers and this second plurality of creators is labeled as 'usual' or 'non-fake' creators.

In some embodiments, the first dataset is labeled to further identify or differentiate the plurality of 'fake' creators characterized by having 'bought followers' from another plurality of 'fake' creators characterized by having 'bought likes'.

At step 504, based on the administrator's request, via his computing device 107, the module 144 generates at least one GUI to enable the administrator to view, select and/or add first and second plurality of features or parameters for the at least one machine learning model to be trained on for each of the creators in the first and second labeled datasets. In some embodiments, the first plurality of features is based on a creator's profile information such as, for example:
  ratio of followers count to follows count
  length of description
  length of full name
  length of username
  difference between full name and username/name length
  number of digits in username
  number of posts/followers count
  number of posts/follower count In some embodiments, the second plurality of features or parameters is based on a creator's posts' information. The second plurality of features describe the distribution of a number of likes and comments on posts and the frequency of publications using one or more statistical characteristics such as, but not limited to, mean, median, standard and/or quantiles.

At step 506, the administrator uses the at least one GUI to configure the module 144 to include a third feature or parameter for the at least one machine learning model to be trained on. In some embodiments, the third feature or parameter is a ratio of the number of 'fake' creators in the first dataset and the number of 'non-fake' creators in the second dataset. In embodiments, the third feature or parameter is used to train the at least one machine learning model on an estimated ratio of suspicious or fake creators to unsuspecting or non-fake ones in a social media networking channel (such as, for example, INSTAGRAM®) in general. In some embodiments, a value of the third feature or parameter ranges from 10% to 20%.

At step 508, the administrator instructs the module 144 to access, from the at least one database 105, the first and second datasets, one by one, to be provided as input data to the at least one machine learning model for training using a learning algorithm. For each input data, the at least one model uses the first plurality of features, the second plurality of features and the third feature to perform forward propagation in order to generate an output classifying an input data of a creator as suspicious/fake or non-fake. In some embodiments, the first plurality of features, the second plurality of features and the third feature are input to at least one machine learning model as a vector for each input data.

In some embodiments, the module 144 leverages machine learning algorithms comprising a first machine learning model for processing followers (followers list) with the labeled training dataset of fake users characterized by 'bought followers' and a second machine learning model for processing engagement (for example, posts, engaged audience) with the labeled training dataset of fake users characterized by 'bought likes'.

At step 510, the module 144 determines an error between the at least one model generated output and a known output—that is, a label (fake or non-fake) associated with the input data. If the output is inconsistent with the label (that is, the model incorrectly identifies a fake or a non-fake creator) then, at step 512, in accordance with the learning algorithm—back propagation is performed according to the difference between the generated output and the known output (that is, the error) to correct one or more parameters (such as, for example, the coefficients or weight matrices) of the at least one machine learning module. If the output is consistent with the label (that is, the model correctly identifies a fake or a non-fake creator), then the flow moves back to step 508 to continue inputting a next set of training data (from the first and second datasets) of a creator to the at least one model for processing.

At step 514, the module 144 calculates the following first, second and third metrics for quality validation of the output generated by the at least one model:
  Precision (also referred to as 'positive predictive value') is a fraction of relevant instances among the retrieved instances. The value of this metric is indicative of what proportion of suspicious or fake creators are identified correctly by the machine learning model.
  Recall (also referred to as 'sensitivity') is the fraction of relevant instances that have been retrieved over the total amount of relevant instances. This value reflects what proportion of creators identified as suspicious or fake by the machine learning model are in fact suspicious or fake.
  ROC-AUC score—this metric is indicative of how well the machine learning model has learned to separate the suspicious or fake creators from the usual or non-fake creators.

In embodiments, each of the first, second and third metrics can take values from 0 to 1 and the closer their values to 1, the better.

In some embodiments, the module 144 determines, at step 516, if following values of the first, second and third metrics are achieved:
  Precision value of approximately 0.75
  Recall value of approximately 0.7
  ROC-AUC score of approximately 0.95

If the desired values for the first, second and third metrics are not achieved then the module 144 continues to iteratively train the at least one model using further sets of training data (from the first and second datasets) and the flow moves back to step 508. However, if the desired values for the first, second and third metrics are achieved then the module 144 stops the training process, at step 518.

In some embodiments, the at least one machine learning model, trained according to the method 500, may process inputted profile and posts data of a creator to predict a percentage of fake activity (for example, 30% of followers of the creator are suspicious). In some embodiments, the at least one machine learning model, trained according to the method 500, may process inputted profile and posts data of a creator to determine a risk group of suspicious activity. That is, instead of predicting a percent of such activity for post based on engaged audience (likes or comments) or on followers (in case of their availability), the model is able to attribute each post or creator to a safety group as follows:
  <10% posts identified as fake or suspicious—then the creator is classified in a low risk group
  >10% and <30% posts identified as fake or suspicious—then the creator is classified in an average risk group
  >30% and <50% posts identified as fake or suspicious—then the creator is classified in a high risk group
  >50% posts identified as fake or suspicious—then the creator is classified in a very high risk group In some embodiments, the learning algorithm is stochastic gradient descent that calculates the error and updates the parameters of the machine learning module for each input data in the first and second datasets. In some embodiments, the learning algorithm is batch gradient descent that calculates the error for each input data in the first and second datasets, but only updates the parameters of the machine learning module after all training datasets have been evaluated. In some embodiments, the learning algorithm is mini-batch gradient descent that splits the first and second datasets into small batches that are used to calculate the error and update the machine learning module parameters.

As discussed earlier, at step 508, in some embodiments the module 144 leverages machine learning algorithms comprising a first machine learning model for processing followers (followers list) with a labeled training dataset of fake users characterized by 'bought followers' and a second machine learning model for processing engagement (for example, posts, engaged audience) with a labeled training dataset of fake users characterized by 'bought likes'. Accordingly, Table C below shows results of roc_auc (area under the receiver operating characteristic curve) score, precision and recall metrics computed for quality validation of the first and second machine learning models.

TABLE C

| Metric | Followers model (first model) | Engagement model (second model) |
| --- | --- | --- |
| Roc_auc | 0.9985 | 0.951 |
| Precision | 0.9582 | 0.7926 |
| Recall | 0.9628 | 0.661 |

In various embodiments, the precision metric can be modulated to be higher with a lower recall metric and vice versa. The choice of the modulation of the precision and recall metrics is dependent on what is more important to predict more accurately—fake or usual users.

Table D below shows an exemplary set of results across a portion of the first and second plurality of features/parameters for the first and second machine learning models, respectively.

TABLE D

| Followers model (first model) | | Engagement model (second model) | |
| --- | --- | --- | --- |
| Feature/parameter | SHAP value | Feature/parameter | SHAP value |
| Mean of comments | 0.69 | Number of posts/followers | 1.32 |
| Number of posts/followers | 0.52 | Mean of comments | 0.97 |
| Ratio of followers to follows | 0.35 | 0.75 quantile of comments | 0.7 |
| Standard deviation of comments | 0.31 | Number of posts/followers | 0.68 |
| Mean of likes | 0.31 | Ratio of followers to follows | 0.63 |
| 0.75 quantile of comments | 0.3 | 0.25 quantile of posts frequency | 0.33 |
| Length of description | 0.26 | Standard deviation of comments | 0.3 |
| 0.25 quantile of posts frequency | 0.27 | Length of description | 0.24 |

Figure 4A:
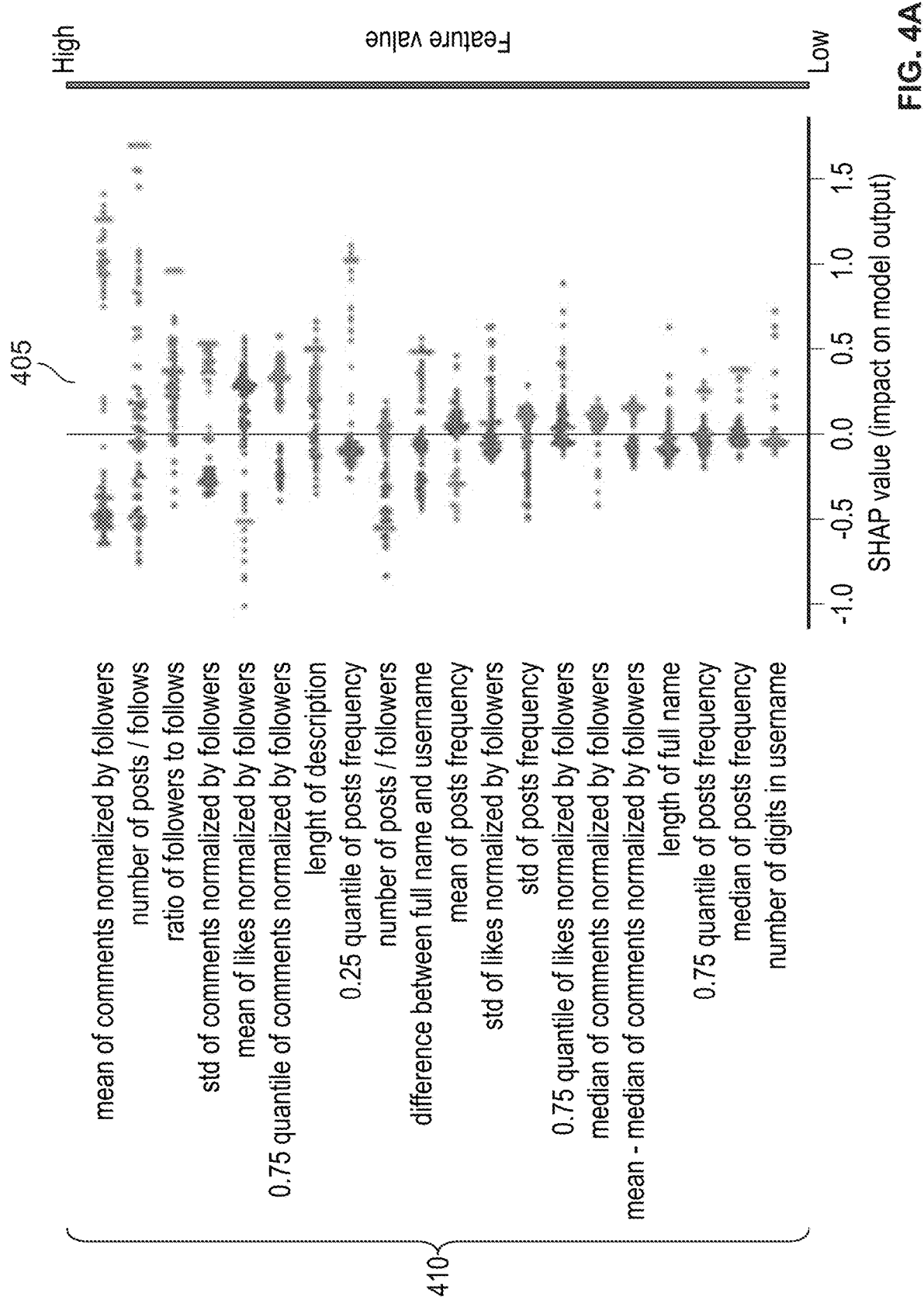
FIG. 4A shows a first graph illustrating SHAP (Shapley) values for a first plurality of features predicted by a first machine learning model, in accordance with some embodiments of the present specification.
Figure 4B:
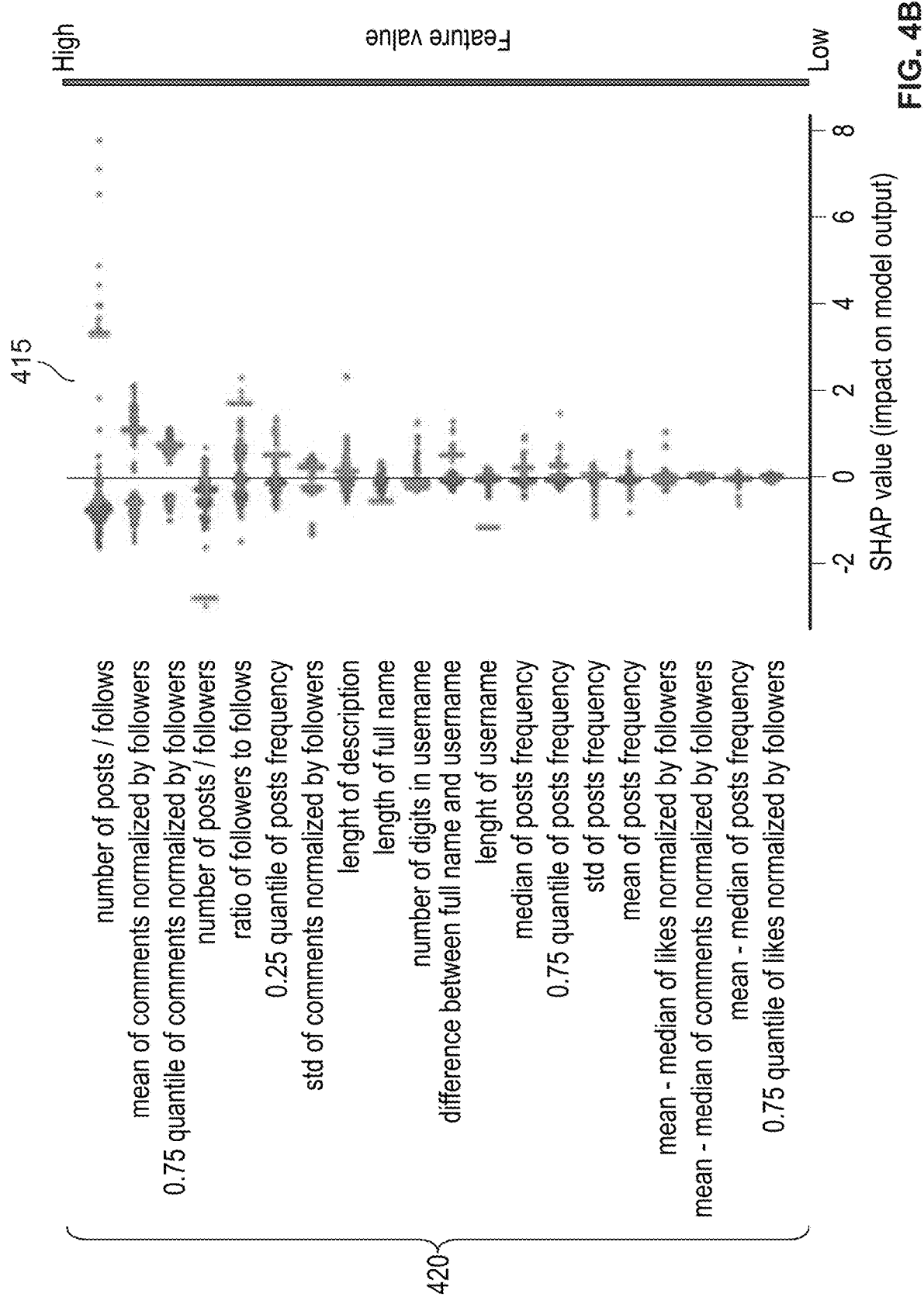
FIG. 4B shows a second graph illustrating SHAP values for a second plurality of features predicted by a second machine learning model, in accordance with some embodiments of the present specification.

FIG. 4A shows a first graph 405 illustrating Shapley (SHAP) values for a first plurality of features 410 for the first machine learning model (followers model) while FIG. 4B shows a second graph 415 illustrating SHAP values for a second plurality of features 420 for the second machine learning model (engagement model). In embodiments, a creator with SHAP value >0 (that is, a positive SHAP value) is determined to be a fake while a creator with SHAP value <0 (that is, a negative SHAP value) is determined to be not fake.

Payments/Subscription Engine or Module 146

The payments/subscription module 146 implements a plurality of programmatic instructions or code to facilitate workflow processes and protocols related to one or more pricing models for creators as well as subscription models for both creators and marketers while signing up for the services offered by the platform 101. Following are typical pricing models for creators, in accordance with some embodiments of the present specification:

Pay-per-post: this pricing model scales off the number of posts requested. No matter the content type, from text to video, a marketer pays a flat rate. In some instances, creators may set specific amounts, based on the post type.

Pay-per-click: a performance-driven pricing model, pay-per-click depends on the number of clicks driven by a post. That means that users follow a creator's calls-to-action (CTAs) to visit a marketer's web site, for example.

Pay-per-acquisition: A more aggressive results-driven pricing model, pay-per-acquisition scales off a post's conversion rate. A conversion can range from someone purchasing a marketer's product to joining the marketer's email list.

Pay-per-subscribers: Another common pricing model, pay-per-subscribers relies on a creator's subscriber or follower number.

Pay-per-view: A results-driven pricing model, page-per-view scales off the average number of views earned by a creator's content.

Web Crawler Module 148

In embodiments, a creator may make a post to one or more social networks (or online communities) that may be used for launching a marketing and advertising campaign. In some embodiments, the post made by the creator may be promoted by the social network directly (such as, for example, through a method used to increase visibility of the promoted post), or may be promoted by virtue of the posting by the creator, such as where the creator makes a standard post that is an advertisement that can be viewed by all of the creator's connections on the associated social network or online community.

The analytics engine or module 136 enables marketers and creators to monitor effectiveness or performance of the marketing and advertising campaign (by way of a plurality of statistics, metrics and analytics) across social networks and/or online communities. The analytics module 136 needs social network (and online community) data in order to generate the plurality of statistics, metrics and analytics. In some embodiments, the analytics module 136 may receive the social network data from the social networks directly, such as via application programming interfaces associated therewith. In some embodiments, the analytics module 136 may use the web crawler module 148 to navigate web pages or application programs of a social network and an online community to identify and obtain relevant data associated therewith.

FIG. 2 illustrates an exemplary workflow 200 of a marketing campaign within a platform in accordance with some embodiments of the present specification. Marketers 202 and influencers 204 are enabled to communicate with each other through a series of protocols, through the platform.

In some embodiments, a payment protocol 206 (see steps 608 and 622 of FIG. 6) facilitates receiving a payment from marketers 202 and providing payments to creators 204, and at some point to communities 208 that participate in reviewing the content created by creators 204.

Initially, in some embodiments, marketers 202 may attempt to find creators 204, suitable to the requirement of the products to be marketed, through the platform using a discovery protocol 210. In accordance with the discovery protocol 210, as soon as content creators sign up and register with the platform 101 (FIG. 1A, 1B) their personalized profile will be discoverable by marketers. Marketers are able to sort and filter through the entire database of creators using a plurality of criteria or variables in order to find the perfect creator for their campaign. Thus, creators are discovered easily through the protocol 210 and marketers get full transparency while working with them. The marketers 202 may define their requirements (that is, choose one or more of the plurality of criteria or variables) through an interface to the platform 101, which are shared with potential matching creators 204. In one embodiment, the system matches marketers 202 and creators 204 by comparing the requirements of marketers 202 with the characteristics or profile data of creators 204. In another embodiment, the system enables marketers 202 or creators 204 to actively search for desired partners by searching for specific profile data or characteristics.

In some embodiments, an insights protocol 212 is used to exchange social insights between marketers 202 and creators 204, so as to increase followers/engagement of the content created by the creators 204. Social insights provided by the creators 204 to marketers 202 may additionally include insights to find target audience.

In some embodiments, content created by the creators 204 is passed through a content review protocol 214 for a review. Once a feedback is received, the content may be edited and shared with one or more communities 208 (also referred to as 'community content reviewers') for approval. In return, a second round of review feedback may be received by the creators 204. In some embodiments, the content is exchanged between the creators 204 and the communities

208 multiple times before the content is finalized and sent for a final review through content review protocol 214. From here, the approved content is made live through one or more channels. A reporting protocol 216 is used to report the progress of the content after it is made live. The platform may additionally analyze the performance of the live content. Reports and insights from the analysis are shared with the marketers 202.

FIGS. 3A to 3D provide some exemplary views of some types of reports that may be generated by the platform, in accordance with embodiments of the present specification. FIG. 3A illustrates a weekly observation 302 of a video blog posted by a creator. FIG. 3B illustrates a display of the posts 304 posted by creators that solicited the most engagements from an audience. In some embodiments, the magnitude of the engagements is determined by the numbers of 'likes' received. FIG. 3C illustrates an exemplary report on the demographics 306 of audience that have engaged with a certain post/content. Report 306 shows a break-down of the audience by their ethnicity and income. In other embodiments, other classifications to classify the audience may be used. FIG. 3D illustrates a post 308 that received the most views, and a post 310 that was most reposted. While posts 308 and 310 are about the same product, they were broadcast through different channels and by different creators.

Blockchain Based Content Creation Method or Protocol

The influencer marketing management platform 101 of the present specification transparently connects creators directly with marketers who are looking for the right partners to promote their brands. For marketers, there are currently multiple layers of third-party agencies that have to be worked through before they can partner with the right content creators. Each of these layers creates additional costs and delays before content can be delivered and creators get paid, which is massively inefficient and too expensive for many brands and companies.

In accordance with some aspects of the present specification, the campaigns engine or module 140 is configured to facilitate creation and finalization of content creation proposal related to a marketing campaign (generated by at least one creator) and transformation of the content creation proposal into a smart contract based on blockchain. In some embodiments, in accordance with a payments protocol, the blockchain based smart contract enables immediate and secure payments (that are scalable across borders) to creators with the use of tokens instead of restrictive fiat currencies.

Figure 6:
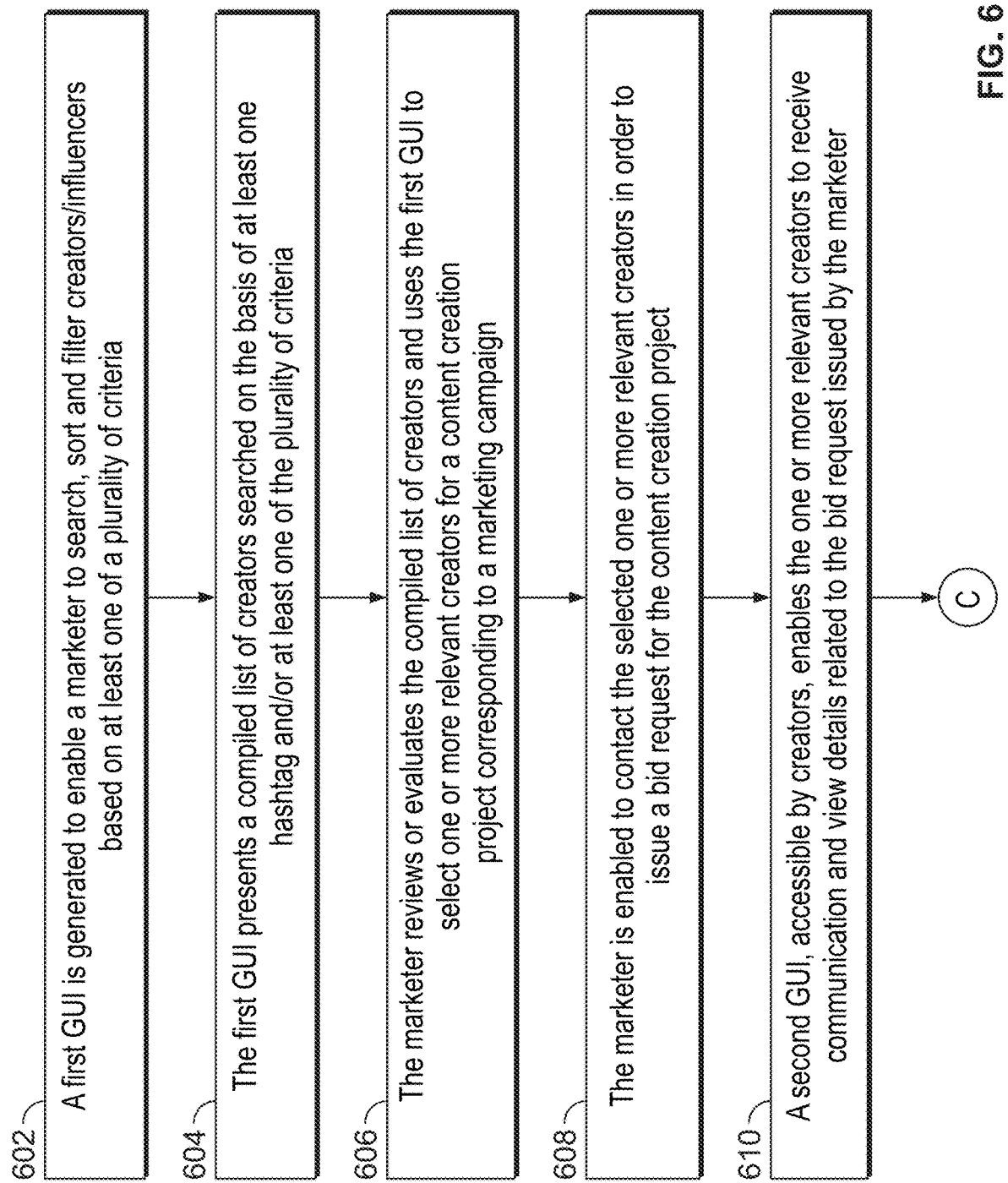
FIG. 6 is a flowchart showing a plurality of exemplary steps of a method for enabling marketers and creators to engage in content creation contracts or proposals, in accordance with some embodiments of the present specification.
Figure 6:
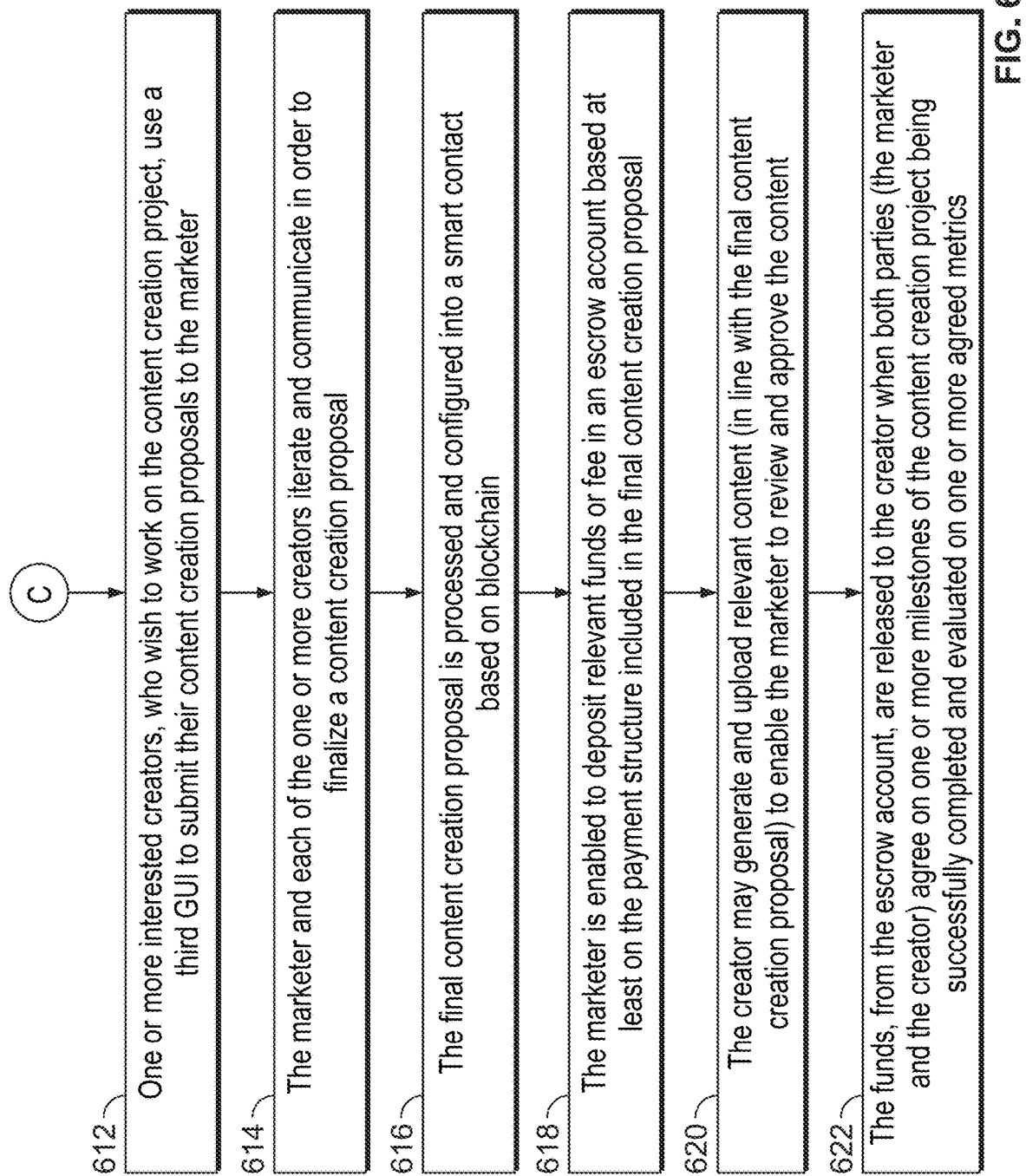

FIG. 6 is a flowchart of a plurality of exemplary steps of a method of enabling marketers and creators to engage in content creation contracts or proposals, in accordance with some embodiments of the present specification. The method is implemented by the platform 101 in the system 100 of FIGS. 1A, 1B. At step 602, the platform 101 generates a first GUI to enable a marketer to search, sort and filter creators/influencers based on at least one of a plurality of criteria (also referred to as a 'discovery protocol'). The first GUI is presented on the marketer's computing device. In some embodiments, the plurality of criteria include variables such as, but not limited to, brand affinity, personality archetype, content topics, gender, age, location, language, ethnicity, religion, income, interests or occupation, sentiment and hashtag. In embodiments, as soon as creators sign up and register with the platform 101, data indicative of their personalized profiles is searchable or discoverable by the marketer.

In some embodiments, the first GUI enables a marketer to initially search for at least one specific hashtag relevant to his marketing campaign and consequently find information such as, but not limited to, current discussions associated with the hashtag, creators who have mentioned the hashtag, and what they think about it. Thereafter, the first GUI enables the marketer to further filter the creators, mined using the at least one specific hashtag, based on at least one of the plurality of criteria.

Figure 7:
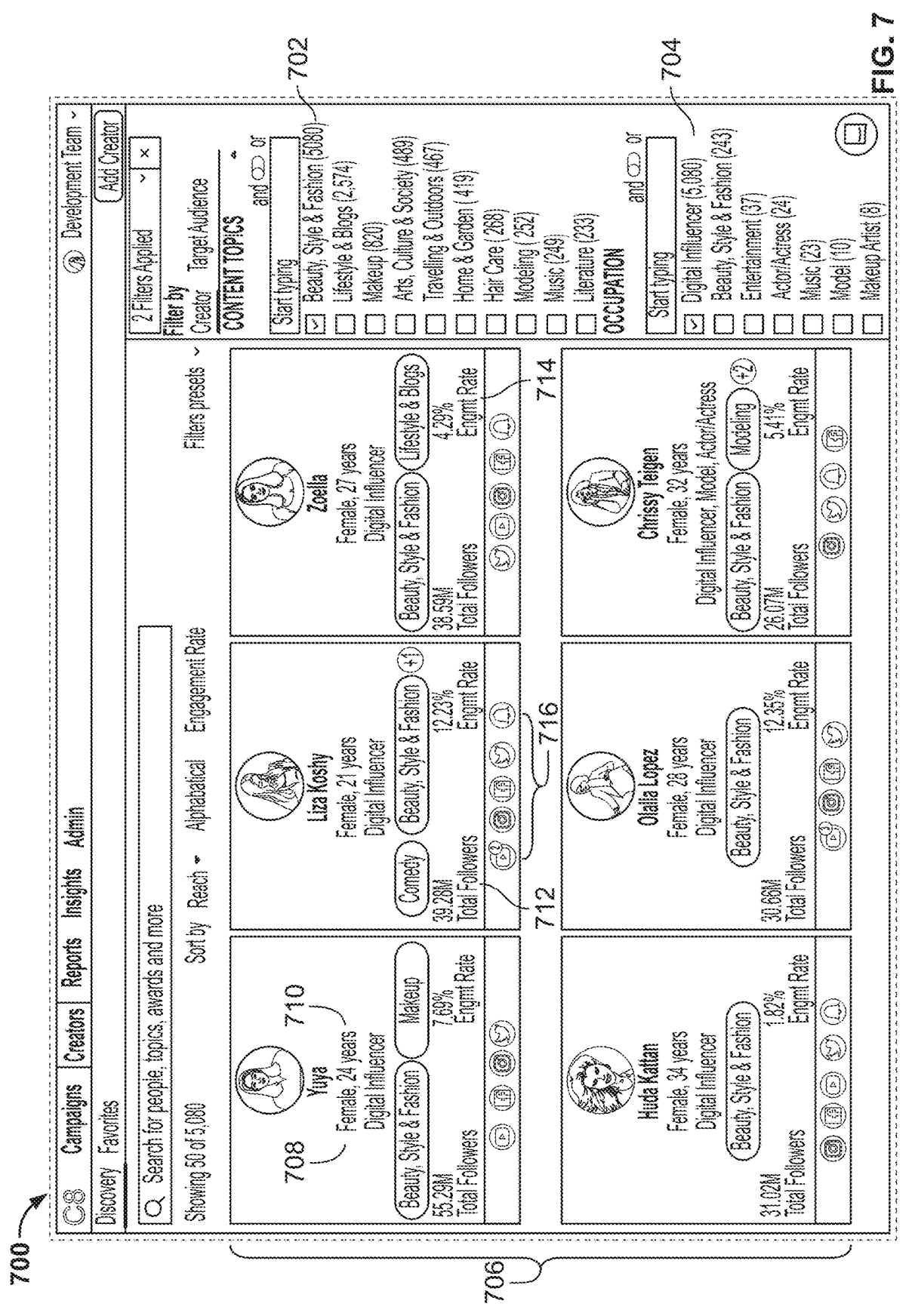
Figure 14:
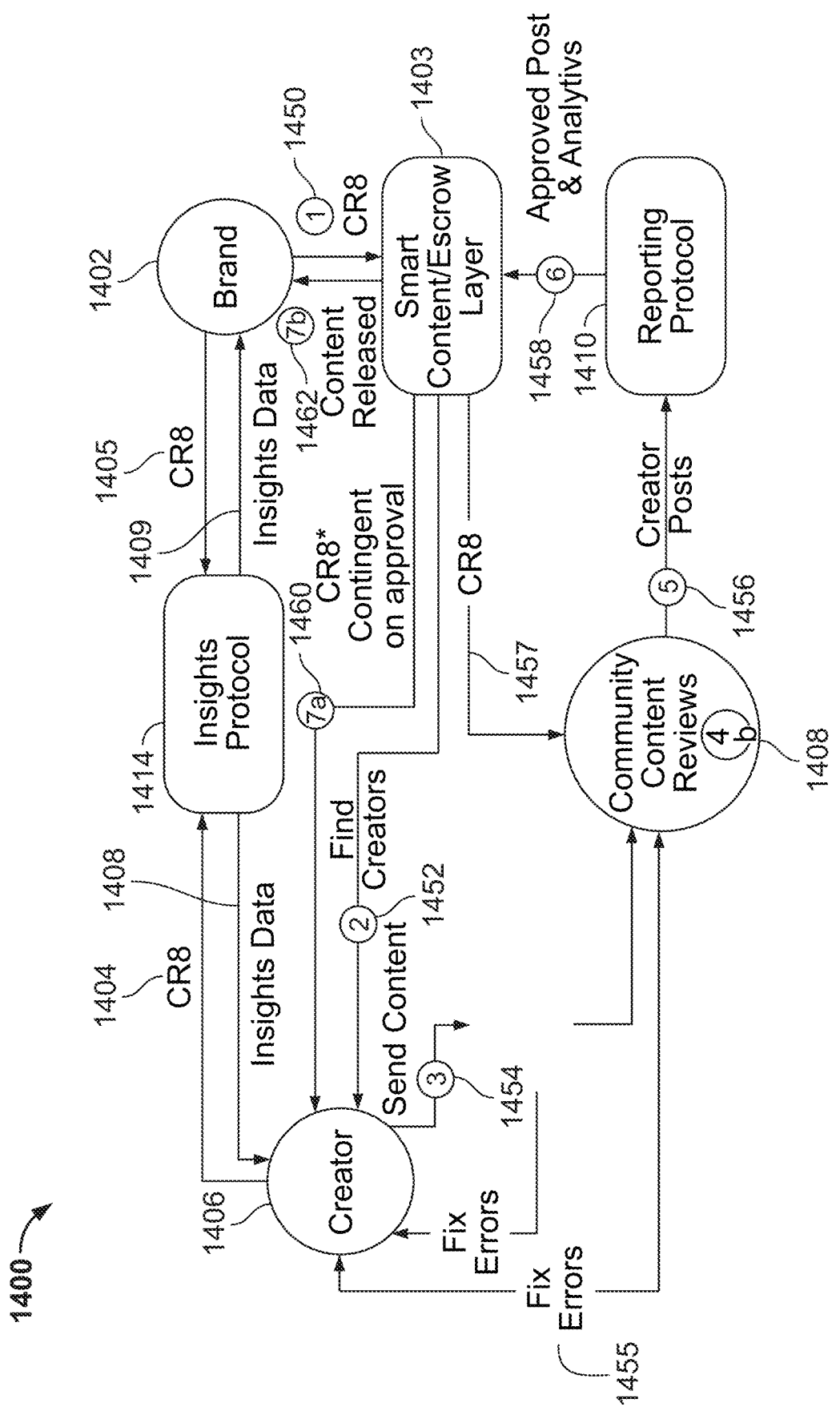
FIG. 14 is a data flow diagram of a module that, when executed, generates a plurality of graphical user interfaces for facilitating a social media campaign.

In some embodiments, the platform 101 uses at least one machine learning model and metadata string search on blockchain to compile a list of creators searched on the basis of at least one hashtag and/or at least one of the plurality of criteria, as described in relation to FIG. 14. FIG. 7 shows an exemplary GUI 700 that a marketer uses to search, sort and filter influencers based on a plurality of criteria, in accordance with some embodiments of the present specification. As shown, a marketer may apply a first filter 702 related to a content topic of "beauty, style and fashion" and a second filter 704 related to an occupation of "digital influencer". The platform 101 presents a plurality creators 706 based on the first and second filters 702, 704. Each presented creator 706 is also characterized by additional data indicative of at least gender 708, age 710, total number of followers 712, engagement rate 714 and social media channels 716 that a creator is active on.

Referring back to FIG. 6, at step 604, the first GUI presents a compiled list of creators searched on the basis of at least one hashtag and/or at least one of the plurality of criteria.

At step 606, the marketer reviews or evaluates the compiled list of creators and uses the first GUI to select one or more relevant creators for a content creation project corresponding to a marketing campaign. At step 608, the platform 101 enables the marketer to contact the selected one or more relevant creators in order to issue a bid request for the content creation project. In some embodiments, the messaging engine or module 134 enables the marketer to contact the one or more creators through one or more ways of communication such as, for example, email and instant messaging.

At step 610, the platform 101 generates a second GUI, accessible by creators, that enables the one or more relevant creators to receive communication and view details related to the bid request issued by the marketer. It should be appreciated that the one or more relevant creators are enabled to accept or reject the bid request received directly from the marketer, with no middlemen or intervening third-party.

At step 612, one or more interested creators, who wish to work on the content creation project, use a third GUI generated by the platform 101 to submit their content creation proposals to the marketer. In alternate embodiments, the second GUI itself may be used to submit content creation proposals.

At step 614, the platform 101 allows the marketer and each of the one or more creators to iterate and communicate between them in order to finalize a content creation proposal. In some embodiments, the final content creation proposal includes legal terms data indicative of at least a scope of work, milestones (including due dates for delivering content), a suitable payment structure, evaluation metrics and remedies/penalties for late or poor work delivery that are agreed and accepted by both parties to the proposal—that is, both the marketer and the creator.

At step 616, the platform 101 processes and configures the final content creation proposal into a smart contact based on blockchain. The blockchain based smart contract is stored in the at least one database 105.

At step 618, the platform 101 (using the payments/subscription engine or module 146, for example) is configured to enable the marketer to deposit relevant funds or fee in an escrow account based at least on the payment structure included in the smart contract corresponding to the final content creation proposal. In various embodiments, the payments, funds or fee is in the form of tokens such as, for example, CR8 tokens.

At step 620, the creator may generate and upload relevant content on the platform 101 (in line with the final content creation proposal), for communication to the marketer, to enable the marketer to review and approve the content. In some embodiments, all content uploaded to the platform 101 is watermarked and presented in lower or sub-optimal visual quality (for example, in a resolution that is less than optimal) until the content approval process, by the marketer, is complete. A high or optimal visual quality version (for example, in a resolution that is optimal), without watermark, may be sent to the marketer once the content creator is paid (such as, for example, a payment linked to a first milestone of generating a video). This will ensure that content is not prematurely used without the creator's consent.

At step 622, the platform 101 is configured to release at least a portion of the funds, from the escrow account, to the creator when both parties (the marketer and the creator) agree on at least a portion of one or more milestones of the content creation project being successfully completed/fulfilled and evaluated on one or more agreed metrics. In some embodiments, the funds are released in a staged or phased manner depending upon the milestones achieved by the creator to the satisfaction of the marketer. In other words, as the creator works he receives payments (in the form of tokens) after each milestone. The finished content product can then be propagated to external audiences (for example, followers of the creator on various social media platforms) targeted by the marketing campaign. In embodiments, the smart contract is processed by the platform 101 to calculate and settle all fees, payments or billing due to the creator as well as enforce all legal terms for the involved parties.

It should be noted that the steps 608 and 622 constitute a payments protocol (protocol 206 of FIG. 2), in accordance with some embodiments.

In some embodiments, if a marketer decides to cancel a campaign after content is already created and uploaded by a creator for review there may be a cancellation fee paid out to the content creator equal to a portion, say 50%, of the original amount agreed upon.

In some embodiments, when a marketing campaign is over, the platform 101 is configured to generate one or more GUIs to enable marketers and content creators to rate each other on a scale of, say, 1 to 5 based on the quality of their experience. An overall rating may be determined as an average of all ratings or grades, assuming they meet a predefined threshold number of ratings or grades. In some embodiments, the individual ratings or grades may remain anonymous.

In some embodiments, the platform 101 is configured to measure the efficacy and impact of the created content based on one or more metrics (see discussion with reference to FIG. 8). This enables the platform 101 to, over time, generate and recommend standardized pricing structures for content creation proposals or smart contracts.

In some embodiments, the platform 101 is configured to calculate an appropriate time for the created content to be posted on one or more social media channels and sends periodic alerts to the team for posting, accordingly.

In some embodiments, the platform 101 is configured to generate and deliver periodic feedback alerts to the marketer during the course of the marketing campaign to enable the marketer to direct the creator to make content adjustments, as needed.

In some embodiments, to protect both parties, the platform 101 is configured to impose one or more penalties on the creator for lack of efficiency, poor quality and/or slow delivery with reference to the content creation project. FIG. 8 illustrates data corresponding to an exemplary content creation proposal 800 agreed and finalized between a marketer and a creator, in accordance with some embodiments of the present specification. The proposal 800 includes first data 802 indicative of one or more milestones, second data 804 indicative of one or more work elements or scope of work associated with each of the one or more milestones, third data 806 indicative of one or more metrics to evaluate desired efficacy and impact of the content created within the scope of work associated with each of the one or more milestones, fourth data 808 indicative of a timeline for completion of the scope of work associated with each of the one or more milestones, fifth data 810 indicative of a fee or funds to be released to the creator (from an escrow account) in association with completion of the scope of work associated with each of the one or more milestones, and sixth data 812 indicative of at least one penalty or remedy imposed on the creator in case of late and/or poor delivery of the scope of work associated with each of the one or more milestones.

For example, as a first milestone 802*a* the creator's scope of work 804*a* comprises a first work element of generating 3 Steemit articles, a second work element of generating 2 Reddit articles and a third work element of generating 4 YOUTUBE® videos. Metrics 806*a* include a first metric of generating 10,000 followers, a second metric of generating 2,000 favorable comments and a third metric of achieving 500 amplifications as a as a result of launching/posting of the first, second and third work elements. The scope of work 804*a* has an associated date 808*a* of delivery or completion. A fee of fund 810*a* of 10,000 CR8 tokens is released to the creator on completion of the scope of work 804*a* within the date 808*a* and on fulfilling the metrics 806*a*. In case the creator overshoots the date 808*a* and/or falls short of achieving one or more of the metrics 806*a*, a penalty 812*a* of 10% fee deduction is imposed on the creator.

Automated Content Review Protocol

In some embodiments, the platform 101 implements a content review engine or module 150 that is configured to leverage at least one machine learning model to automatically review all content created and submitted by a creator for approval by a marketer and for posting, launching or propagating to audiences in one or more social media channels.

In some embodiments, the module 150 is configured to leverage at least one machine learning model to automatically review and flag any content that does not include correct or desired attributes (based on a marketing campaign-specific guidelines) such as, but not limited to, keywords, hashtags, hyperlinks, and product (using image recognition).

In some embodiments, the module 150 is configured to leverage at least one machine learning model to automatically review texts and implement image recognition to flag restricted content that includes undesirable data such as, but not limited to:

- Competitor brands
- Restricted words (swear words, controversial topics, political commentary, etc.)
- Third party logos and branding
- Music without usage rights
- Plagiarized or unoriginal content
- Lack of FTC compliance—all posts must be FTC compliant. For example, for an image: influencer must use approved hashtags in caption, for a video: influencer must use a verbal or text overlay disclosure within the first 15 seconds in addition to approved hashtags in the caption, for stories: influencer must use text overlay with appropriate hashtag disclosures.
- Referring to People and locations without proper waivers—participation waiver (in a form satisfactory to the marketer) must be signed by individuals other than the influencer who appear in the content. Similarly, location waiver (in a form satisfactory to the marketer) must be signed if shooting on location not required by the marketer.
- Any illegal activity Community Content Reviewers or Members In accordance with some aspects, the automated content review protocol (implemented by the content review engine or module 150) is augmented by utilizing a community of content reviewers. In some embodiments, brands and marketers can choose to keep a number of CR8 tokens in escrow through a smart contract to pay community members a content verification reward or bounty whenever they find restricted content that the automated content review protocol may miss. The higher the bounty a brand is willing to pay, the more incentive a community member has to search through their content.

Since each marketing campaign has its own set of guidelines that defines what is/is not considered to be restricted content. In some embodiments, the platform 101 generates one or more GUIs to enable individuals, registered with the platform under the profile of content reviewers (in addition of being creators, for example), to search for restricted content.

In accordance with some aspects, the platform 101 is configured to boost a community member's level or ranking within the system for consistently finding restricted content. Higher ranked reviewers may be able to flag content for providing inaccurate information about a product or brand, or for inaccurately portraying the product or brand. A community content reviewer's level or ranking may be lowered if they flag false positives, which will prevent bad actors from randomly flagging content.

Conflict Resolution Protocol

During the content creation and review process, marketers and content creators are encouraged to keep an open line of communication to ensure all campaign requirements and reasonable asks (embodied in a content creation proposal or contract) are fully understood.

In some embodiments, if a conflict arises and both parties (marketers and content creators) are able to come to a mutual resolution, the content review engine or module 150 is configured to generate an option for a marketer to pay a content creator a different amount than what was originally agreed upon. This change will only be accepted if both parties approve the new amount. Following are some exemplary case scenarios:

Case scenario 1—In some embodiments, a marketer asks for additional work done that was outside the scope of the finalized content creation proposal or contract. Consequently, both parties may agree to an amount that is more than the original amount in the contract.

Case scenario 2—In some embodiments, a creator is only able to complete part of the overall scope of the project. Consequently, both parties agree to an amount that is less than the original amount in the contract.

However, in some embodiments, if a conflict arises and both parties (marketers and content creators) are unable to come to a mutual resolution, the content review engine or module 150 is configured to enable either party to stake a predefined number of tokens in order to file a dispute on the platform 101 and bring the case to arbitration. In embodiments, community content reviewers or members can also stake tokens for an opportunity to be chosen, for example randomly, as an arbiter to vote on a decision during disputes. In some embodiments, the more tokens a potential arbiter stakes, the higher likelihood of the person being chosen as an arbiter.

In some embodiments, the content review engine or module 150 follows a process wherein a dispute will require a predefined number 'n' (say, 10) of arbiters to each vote on what percentage (exemplary non-limiting options include 0%, 25%, 50%, 75%, 100%) of the originally agreed amount (that is, according to a finalized content creation proposal or contract that was configured as a smart contract) the marketer owes the content creator. After the vote, the smart contract will pay the creator an amount equal to the average percentage of the 'n' amounts chosen. In some embodiments, the highest and lowest percentages may be disregarded to avoid outliers. The following Table E illustrates an exemplary voting scenario:

TABLE E

| | Arbiter | | | | | | | | | |
| --- | --- | --- | --- | --- | --- | --- | --- | --- | --- | --- |
| | 1 | 2 | 3 | 4 | 5 | 6 | 7 | 8 | 9 | 10 |
| Vote Amount of Tokens Owed | 50% | 25% | ~~0%~~ | 50% | ~~75%~~75% | 50% | 50% | 75% | 50% | |

Average of all votes (disregarding votes from arbiter 3 and 5) = 53.125%. Thus, the smart contract will pay the creator an amount equal to 53.125% of the originally agreed amount.

In some embodiments, to ensure a timely process, each arbiter has a predefined number of hours (say, for example, 24 hours) to make their vote. Otherwise, a new arbiter is chosen to replace anyone who does not cast a vote in time. After successfully voting on a dispute, the arbiters may be rewarded (by the reward and recognition engine or module 152) a predefined number of tokens for their time and effort.

Reporting, Analytics and Insights Protocol

After content is created and approved, the marketer or content creator may post the content online to agreed-upon social media channels or platforms. In some embodiments, the platform 101 implements the analytics engine or module 136 that is configured to execute a reporting and insights protocol to track and aggregate campaign metrics across social media channels or platforms over which the content or marketing campaign is propagated.

In some embodiments, the reporting and insights protocol utilizes APIs of the social media platforms to aggregate a plurality of data that is publicly available. The aggregated plurality of data is processed by at least one machine learning model to generate and provide insights such as, for example, audience sentiment based on comments and audience demographics of those who engage with the content. In some embodiments, the module 136 is configured to generate following metrics with reference to various social media platforms:

Total engagement metrics
Earned media value
Audience demographics
Audience sentiment
Aggregation of all posts Depending on the goal of the campaign, the reporting and insights protocol may not be necessary if the content is not posted to a social media platform.

In some embodiments, the reporting and insights protocol includes continuous and automatic review of posts to ensure usage terms are upheld after a campaign has ended, and continuously and automatically review new influencer posts to ensure exclusivity terms are upheld.

In some embodiments, the analytics engine or module 136, in response to a creator's or marketer's request, generates at least one insights tracker GUI to enable viewing analytical insights for any public account, hashtag, or location and receive data (downloadable in CSV and PDF formats) indicative of the following:

Follower and engagement growth charts
Followers' age, gender, location, income, ethnicity, religion, language, and interests
Best and worst times to post for maximum engagement
Top posts, hashtags, and filters In embodiments, the reporting and insights protocol enables both marketers and content creators le to use tokens to receive actionable insights in order to ensure a perfect match for campaigns. Marketers may use the reporting and insights protocol to ensure they are targeting the right audience, whether that means focusing on their core group of followers or focusing on users that they have not been able to previously reach. Content creators may use the reporting and insights protocol to help grow their followers and boost their engagement.

In some embodiments, costs for data and service outcomes from the reporting and insights protocol is based on the number of tokens held in a user's cryptocurrency electronic wallet such as, for example, a METAMASK® wallet. For example, for every 10,000 tokens a user holds in his wallet for more than 30 days, the user may be able to view a predefined number or portion of metrics, analytics and/or insights for free. Otherwise, there may be an additional cost in tokens.

Reports, Analytics and Insights Supported by Machine Learning

In accordance with some aspects of the present specification, the platform 101 (including the analytics engine or module 136) enables a creator to utilize machine learning algorithms to generate reports, insights and analytics. The generated reports, insights and analytics enable the creator to help clients (marketers, brands, advertisers) better structure and optimize their marketing campaigns.

In various embodiments, the analytics engine or module 136 leverages machine learning algorithms to perform analysis on a plurality of attributes or variables of audiences (that is, users on social media channels or platforms) such as, for example, age, gender, location, interests, household income, ethnicity, religion, sentiment, language, brand affinity, and personality archetype.

Figure 9:
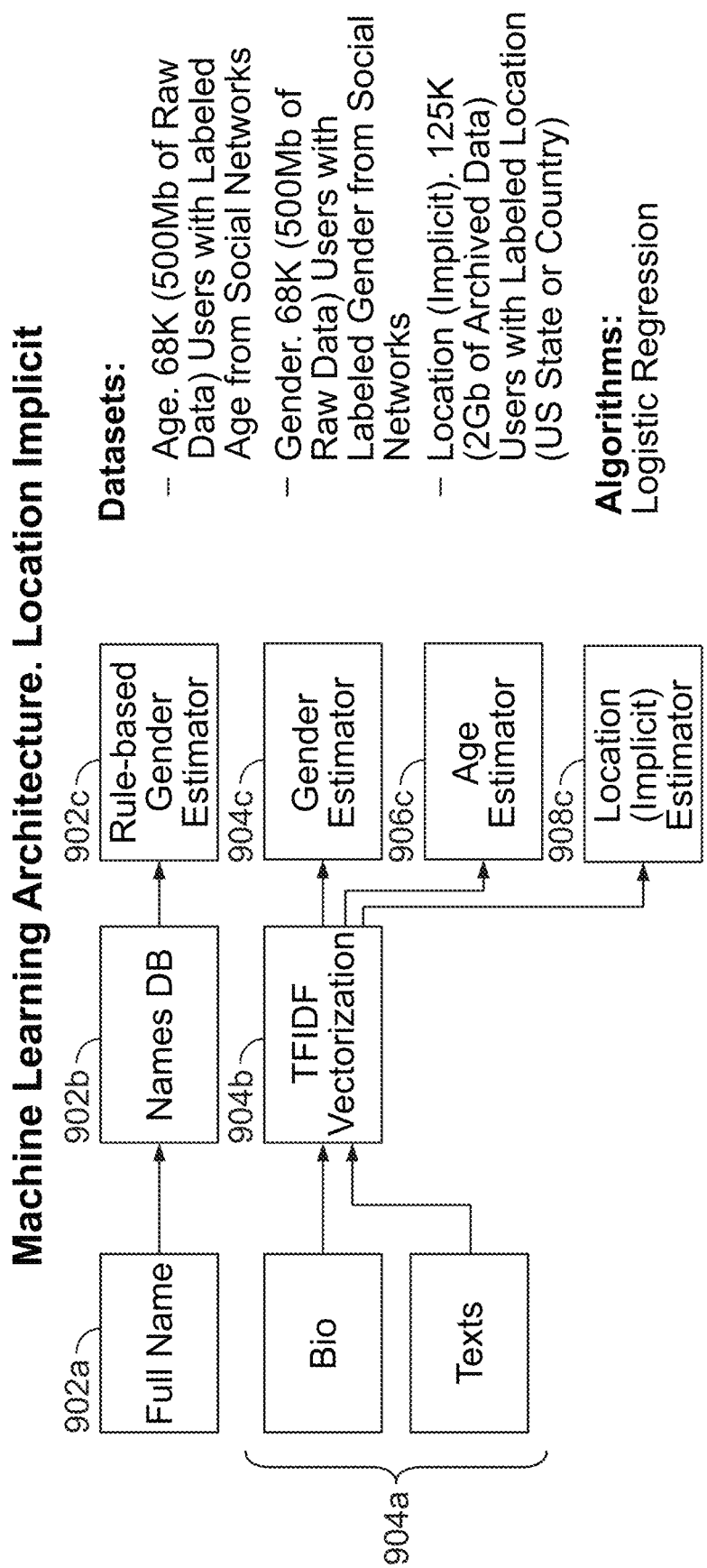
FIG. 9 is a block diagram showing a data flow for predicting gender, age and geographical locations of social media users, in accordance with some embodiments of the present specification.

In some embodiments, one or more machine learning (ML) models are accessed by the module 136 to estimate or predict gender, age, geographical location, religion, ethnicity, income, and interests of social media users. FIG. 9 illustrates algorithms and related data flow for predicting gender, age and geographical locations of social media users, in accordance with some embodiments of the present specification. At step 902a, the module 136 processes a username and/or full name of a social media user to extract a name (for example, MrJohn is reduced to John). Thereafter, at step 902b, the module 136 searches linguistic versions of the extracted name against a database of names and genders. At step 902c, a gender of the social media user is predicted based on the database search. In some embodiments, the module 136 may use one or more predefined rules to predict the gender.

If no name is extractable at step 902a, then at step 904a textual (for example, user posts) and/or biographical data (for example, user profile description) related to the social media user is acquired by the module 136. At step 904b, the textual and/or biographical data is transformed into a vector representation such as, for example, a TFIDF (term frequency-inverse document frequency) vector by the module 136.

In some embodiments, the vector is provided as input, at point 904c, to a first ML model in order to predict a gender (for example, "husband" will be likely treated as male).

In some embodiments, the vector is provided as input, at point 906c, to a second ML model in order to predict an age of the social media user.

In some embodiments, the vector is provided as input, at point 908c, to a third ML model in order to predict a geographical location of the social media user. The third ML model is applied (to the vector to detect a country and/or state of the social media user) where an explicit geographical location is not available in the textual and/or biographical data.

However, where data indicative of explicit geographical names is extractable from the textual and/or biographical data, the extracted geographical names may be sorted using one or more predefined rules (for example, exact names and populations of various locations) and the most relevant location is then provided as output. In embodiments where a geographic name is not explicitly extractable, the third ML model is applied to the textual and/or biographical data.

Figure 10:
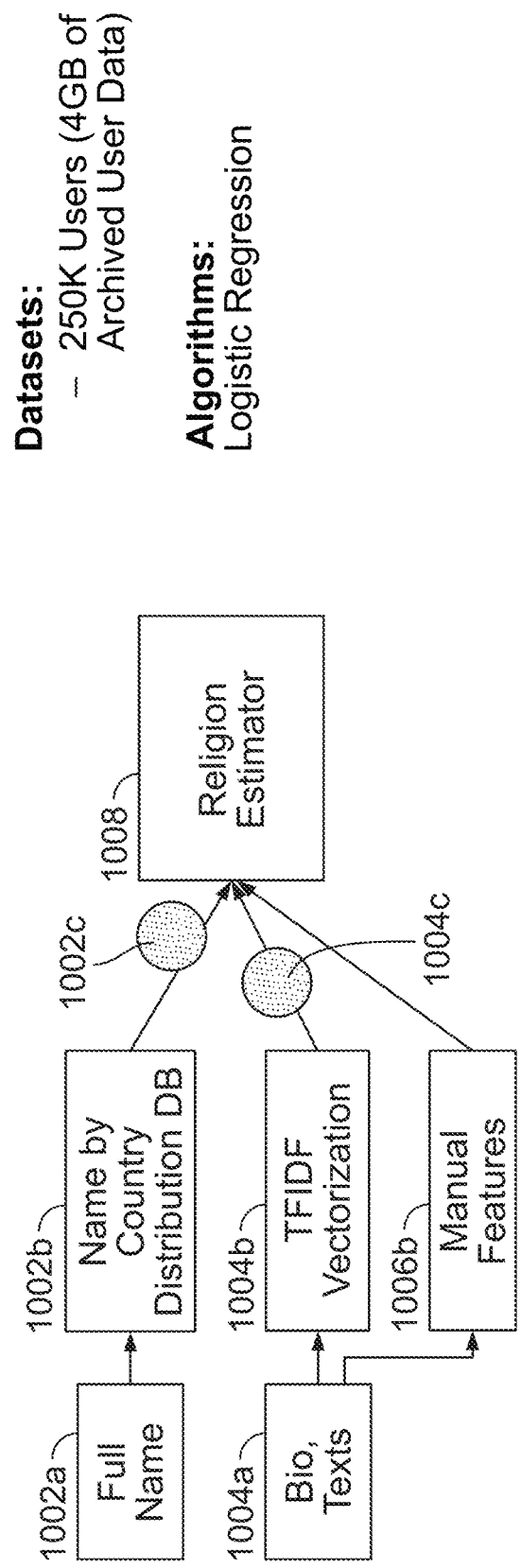
FIG. 10 is a block diagram showing a data flow for predicting religion of social media users, in accordance with some embodiments of the present specification.

FIG. 10 illustrates an algorithm and related data flow for predicting religion of social media users, in accordance with some embodiments of the present specification. In a first pipeline of processing, at step 1002*a*, the module 136 processes a full name of a social media user to extract a name (for example, MrJohn is reduced to John). Thereafter, at step 1002*b*, the module 136 searches linguistic versions of the extracted name against a database of names and religions related to the names. At step 1002*c*, a religion of the social media user is predicted based on the database search. In some embodiments, the module 136 may use one or more predefined rules to predict the religion.

In a second pipeline of processing, at step 1004*a* textual (for example, user posts) and/or biographical data (for example, user profile description) related to the social media user is acquired by the module 136. At step 1004*b*, the textual and/or biographical data is transformed into a vector representation such as, for example, a TFIDF (term frequency-inverse document frequency) vector by the module 136. At step 1004*c*, in some embodiments, the vector is provided as input to a fourth ML model in order to predict a religion of the social media user. In some embodiments, at step 1006*b* (concurrently to step 1004*b*, in some embodiments). Eventually, a final output indicative of the religion is generated, at step 1008, based on a combination of outputs at steps 1002*c*, 1004*c* and 1006*b*.

Figure 11:
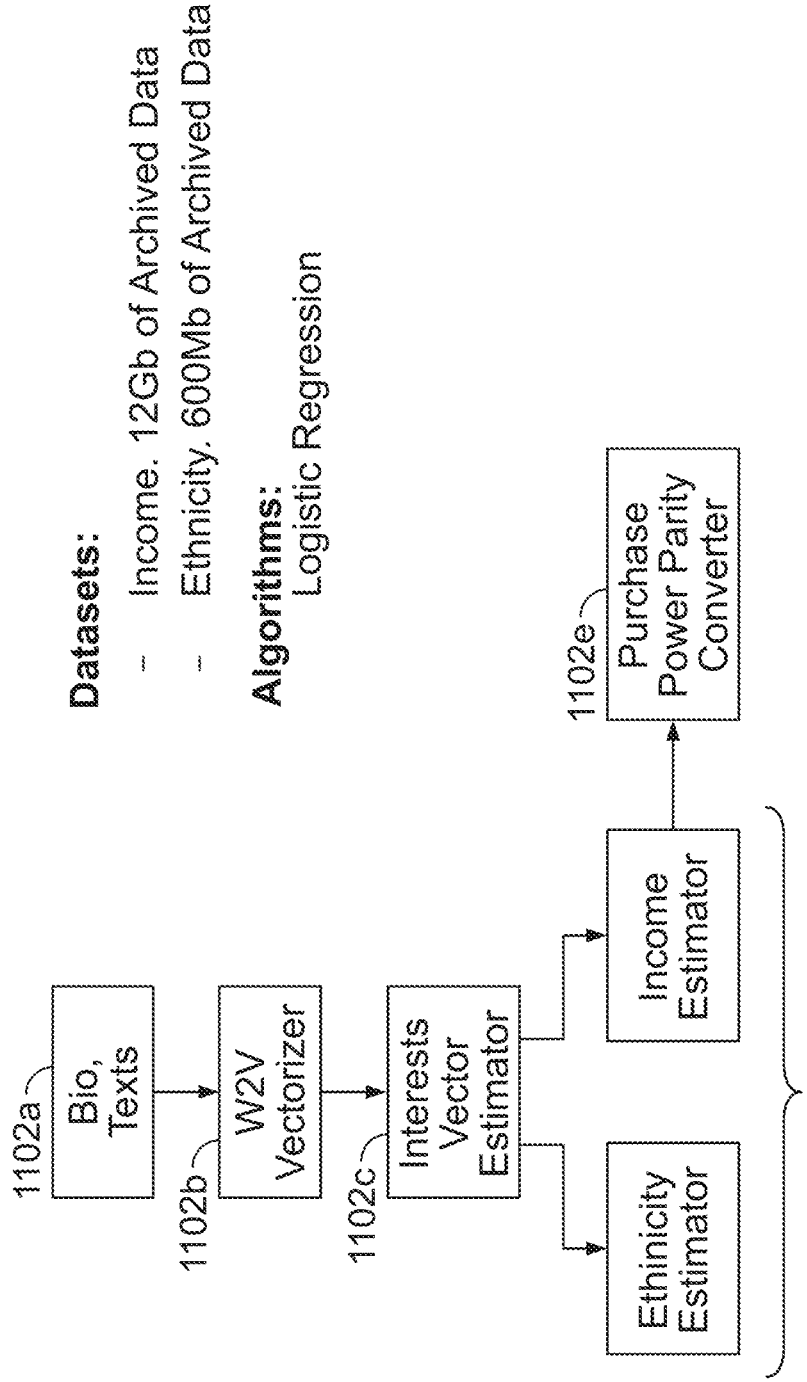
FIG. 11 is a block diagram showing a data flow for predicting ethnicity and income of social media users, in accordance with some embodiments of the present specification.

FIG. 11 illustrates an algorithm and related data flow for predicting ethnicity and income of social media users, in accordance with some embodiments of the present specification. At step 1102*a* textual (for example, user posts) and/or biographical data (for example, user profile description) related to the social media user is acquired by the module 136. The module 136 then attributes the social media user to at least one IAB category.

At step 1102*b*, the textual and/or biographical data for each IAB category is transformed into a vector representation such as, for example, a W2V (word2vec) vector by the module 136. At step 1102*c*, an "interests" vector is generated. At step 1102*d*, in some embodiments, the "interests" vector is provided as input to a fifth ML model in order to predict an ethnicity and income of the social media user. In some embodiments, the fifth ML model classifies the social media user into one of a predefined number of ethnicity groups such as, for example, 4 ethnicity groups of Caucasians, Afro-Americans, Asians, and Hispanic. In some embodiments, the fifth ML model classifies the social media user into one of predefined number (say, 8) of income groups.

The estimated income may further be processed by the module 136 by applying a multiplier that takes into account a purchasing power per country, at step 1102*e*.

Figure 12:
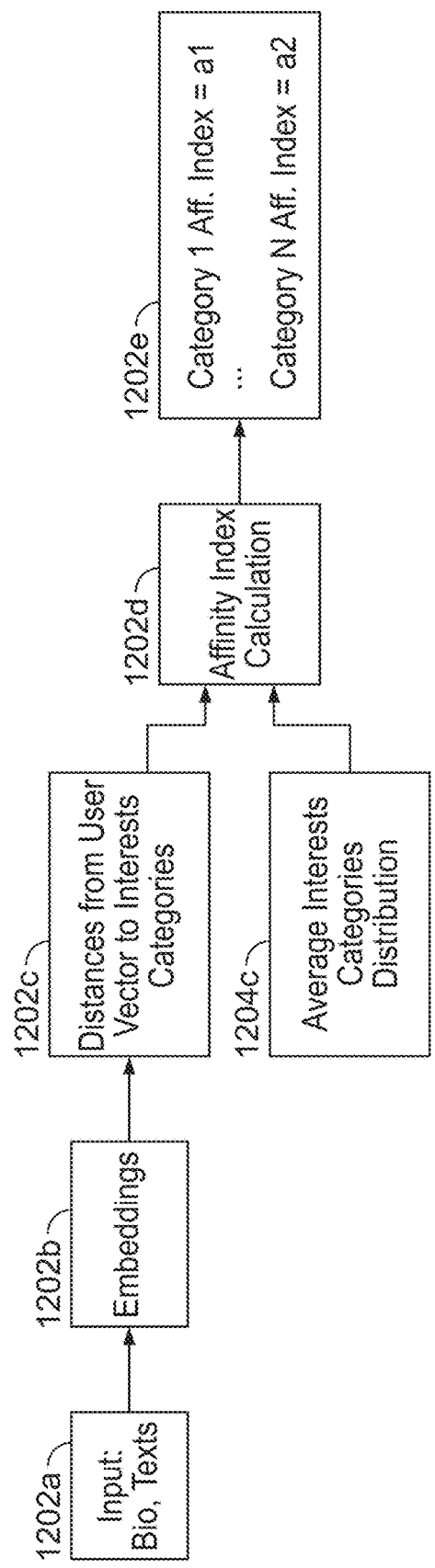
FIG. 12 is a block diagram showing a data flow for predicting interests of social media users, in accordance with some embodiments of the present specification.

FIG. 12 illustrates an algorithm and related data flow for predicting interests of social media users, in accordance with some embodiments of the present specification. At step 1202*a* textual (for example, user posts) and/or biographical data (for example, user profile description) related to the social media user is acquired by the module 136. The module 136 processes the textual and/or biographical data to perform word embedding, at step 1202*b*, where words or phrases are mapped to a vector of real numbers.

At step 1202*c*, a sixth ML model uses the vector to determine the user's closeness to a predefined list of IAB interests (the list comprising about 20 categories of interests, in some embodiments) by calculating raw similarity between specific interest and the user vector representation. At step 1204*c*, the sixth ML model uses the vector to compare interests of the user with interests of average audience. The outputs of steps 1202*c* and 1204*c* are used to determine an interest affinity index, at step 1202*d* to predict an interest of the social media user at step 1202*e*.

Figure 13:
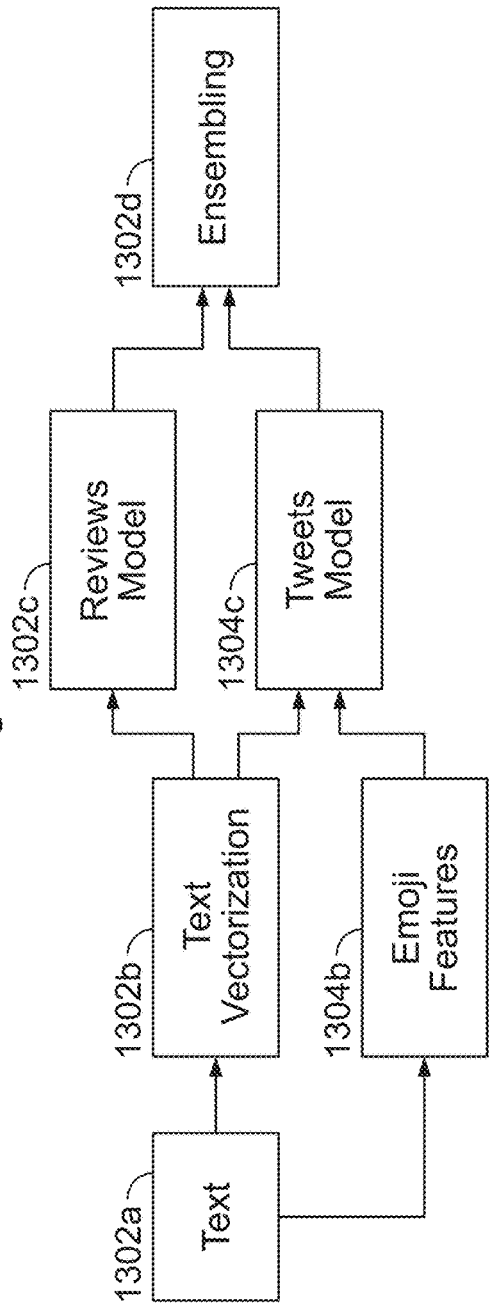
FIG. 13 is a block diagram showing a data flow for predicting sentiments of comments in social media posts by users, in accordance with some embodiments of the present specification.

FIG. 13 illustrates an algorithm and related data flow for predicting sentiments of comments in social media posts by users, in accordance with some embodiments of the present specification. At step 1302*a* textual data (for example, user posts) related to the social media user is acquired by the module 136. At step 1302*b*, the textual data is transformed into a vector representation such as, for example, a TFIDF (term frequency-inverse document frequency) vector by the module 136. In some embodiments, at step 1304*b*, emoji features may be extracted and converted to Unicode text in order to help evaluate or associate sentiment.

At step 1302*c*, the vector is provided as input to a seventh ML model for processing. In some embodiments, the seventh ML model is trained on product and movie reviews. At step 1304*c*, the emoji features are provided as input to an eighth ML model for processing. In some embodiments, the seventh ML model is trained on TWITTER® messages. The seventh and eighth ML models may be used simultaneously to predict a sentiment category—positive, negative or neutral, at step 1302*d*. In some embodiments, each predicted sentiment category is further characterized as follows:

Positive Sentiment—comment indicates affirmation, optimism, support and satisfaction.

Neutral Sentiment—comment indicates an absence of any sentiment (i.e. "Roses are red, tulips are blue").

Negative Sentiment—comment indicates disagreement, lack of enthusiasm, denial or dissatisfaction.

In embodiments, the first, second, third, fourth, fifth, sixth and seventh ML models are trained using corresponding datasets to achieve desired levels of metrics such as, for example, accuracy, precision and recall for associated predictions. Table F provides data indicative of the datasets, labeling and metrics (accuracy, precision and recall) for each of the first, second, third, fourth, fifth, sixth and seventh ML models.

TABLE F

| Model | Dataset | Labelling | Accuracy | Precision/Recall |
|---|---|---|---|---|
| First ML model to predict 'gender' | 68K users (500 Mb of raw data) | Users with labelled gender crawled from social networks | 0.98 (full name) 0.92 (text) | 0.924/0.884 |
| Second ML model to predict 'age' | 68K users (500 Mb of raw data) | Users with labelled age crawled from social networks | 3 years (mean absolute error) | 0.5/0.49 |
| Third ML model to predict 'geographical location' | 125K users (2 Gb of archived data) users with labeled location (US state or country) + 2M tweets (70 Gb of archived data) | Semi-automatically labelled | In case explicit geographical location is available: 0.90 In case explicit geographical location is not available: 0.75 | 0.90 (precision) 0.75 (recall) 0.75 (recall) |

TABLE F-continued

| Model | Dataset | Labelling | Accuracy | Precision/Recall |
|---|---|---|---|---|
| Fourth ML model to predict 'religion' | 250K users (4 GB of archived user data) | Semi-automatically labelled | 0.53 | 0.6/0.53 |
| Fifth ML model to predict 'ethnicity' and 'income' | Ethnicity—600 Mb of archived Data Income—12 Gb of archived Data | Ethnicity—Semi-automatically Labelled Income—Manual labelling | Ethnicity—0.67 Income—0.64 | Ethnicity—0.6735/0.6683 Income—0.604/0.601 |
| Sixth ML model to predict 'interest' | GoogleNews, Wikipedia, posts from social networks | Unsupervised | Not Applicable | Not Applicable |
| Seventh ML model to predict 'sentiment' | Goods\Movie reviews, tweets | Public Datasets + semi-automatically labelled | 0.91 | 0.88/0.83 |

In various embodiments, the first, second, third, fourth, fifth, sixth and seventh ML models or artificial neural networks may be of a deep feed forward network, a perceptron network, a feed forward network, a radial basis network, a recurrent neural network, a long term memory network, a short term memory network, a gated recurrent unit network, an auto encoder network, a variational auto encoder network, a denoising auto encoder network, a sparse auto encoder network, a Markov chain network, a Hopfield network, a Boltzmann machine network, a restricted Boltzmann machine network, a deep belief network, a deep convolutional network, a deconvolutional network, a deep convolutional inverse graphics network, a generated adversarial network, a liquid state machine, an extreme learning machine, an echo state network, a deep residual network, a Kohonen network, a support vector machine network, a neural Turing machine network, or a convolutional neural network with transfer learning network.

In some embodiments, the learning algorithm is stochastic gradient descent that calculates an error and updates the parameters of the machine learning module for each input data in the datasets. In some embodiments, the learning algorithm is batch gradient descent that calculates the error for each input data in the datasets, but only updates the parameters of the machine learning module after all training datasets have been evaluated. In some embodiments, the learning algorithm is mini-batch gradient descent that splits datasets into small batches that are used to calculate the error and update the machine learning module parameters.

In some embodiments, the learning algorithm is logistic regression.

In some embodiments, the module 136 uses the CLD2 library (Compact Language Detector 2) to probabilistically detect a plurality of languages in textual data. The Compact Language Detector 2 is a native library written in C++ to detect the language of plain-text or HTML documents.

Tokens

In accordance with some aspects of the present specification, the platform 101 executes the payments/subscription engine or module 146 that is configured to enable financial transactions (among parties—marketers, content creators/influencers and community content reviewers) in terms of tokens such as, for example, CR8 tokens. In other words, CR8 tokens are the currency used for all financial transactions on the platform 101.

In various embodiments, marketers use CR8 tokens to pay content creators and community content reviewers. Additionally, anyone can use CR8 tokens to utilize the reporting and insights protocol for access to the metrics, analytics and/or insights about their own social media accounts or other public accounts.

In some embodiments, CR8 tokens are earned as follows:
Content creators: Earn CR8 when content is approved by marketers during campaigns.
Community content reviewers: Earn CR8 for accurately flagging content that does not follow a marketer's guidelines or that includes errors.
Gamification of the platform 101:
Marketers who complete a predefined threshold number of campaigns may earn CR8 as a reward.
Content creators who fill out their profile or complete milestones earn CR8 as a reward.

As marketers and agencies begin adopting CR8 tokens, their increased need for CR8 will drive demand on the platform 101 and the value of CR8 will likely rise. In some embodiments, the platform 101 (specifically, the payments/subscription engine or module 146) allows token holders to stake CR8 tokens to either receive metrics, analytics and/or insights or potentially get chosen as an arbiter during disputes. The staking of tokens will thus decrease the available supply of CR8 that are tradable on the platform 101.

In some embodiments, the CR8 tokens may be made available first through a private pre-sale, then a public whitelist pre-sale, and then a public crowd sale. In all cases, in some embodiments, there may be bonuses offered according to the timing of purchase. Any unsold tokens are burned. In some embodiments, bonuses may be locked for a predefined period of time (say 2 months) after the end of the crowd sale.

Proof-Of-Creativity (PoC) Protocol

In accordance with some aspects of the present specification, the platform 101 executes a reward and recognition engine or module 152 that is configured to implement a proof of creativity protocol to determine, generate and allocate/distribute a reward to reviewers of creativity, also referred to as community content reviewers, as detailed with respect to FIG. 14. In some embodiments, the reward is in the form of an associated transaction fee (in CR8 tokens).

It should be noted that the PoC protocol is neither based on an amount of electricity consumed in performing computations to identify a nonce (that is, Proof-of-Work) nor on an amount of coins locked up (that is, Proof-of-Stake). Instead, in accordance with some embodiments, the PoC protocol is based at least on a) a number of projects worked on by a creator on the platform 101 and b) an aggregated rating given to the creator by the marketers that the creator may have worked with over a predefined period of time.

In some embodiments, the PoC comprises of the following phases:

a) Purchase Phase

The first phase begins when a marketer uses the platform 101 in order to begin setting up of data indicative of a marketing campaign and ends when a content creation contract or proposal bid/quote phase begins. In the first phase, the marketer is required to deposit an initial amount of funds or tokens in an escrow account (on the platform 101) which may be configured as an electronic wallet (such as, for example, Metamask). In some embodiments, the initial amount must be greater than or equal to a minimum deposit, which is defined at contract deployment. In some embodiments, the initial deposit as well as subsequent deposits may be distributed over a predefined period of time.

The marketer submits deposits or funds (tokens) in the escrow account, signs an escrow agreement as a result of which a campaign based content creation proposal or contract is initiated.

b) Campaign Phase

This is a second phase that begins when creators select a marketing campaign with a bid/quote corresponding to the content creation contract or proposal. Once the marketer has processed all bids from all interested creators the marketer tags various tasks, associated with setting-up of the content creation contract or proposal, as 'done'. The second phase ends when the marketing campaign is set to end and the escrow funds have been paid out in full to the creator. In embodiments, the marketing campaign is determined to have failed if success conditions (see discussion with reference to FIG. 8), as delineated in the content creation contract or proposal, are not met in the timeframe agreed upon.

c) Consensus Phase

In some embodiments, this third phase comes into play due to both marketers and creators wanting to maximize output and satisfaction. Creators desire to monetize their work, yet are conscious of ensuring the integrity of the content they produce for their audiences.

In some embodiments, creative authority, which refers to an entity deemed to be an authority or oracle by token holder votes, increases when voting in a ⅔rds majority, decreases when the token holders vote in the ⅓rd minority. The module 152 regards a creative process (any process by which a creator creates content) as a cooperative game and ensures that each node (or token holder) is more profitable if it is in a coalition as C(x), which is an indicator of "creativity", approaches 100%.

In some embodiments, the PoC protocol, via the community content reviewers, may punish validators for going against the protocol by withholding transaction fees and credit. Creative authority in a category (for example, writing, multimedia, visual art, etc.) serves as an additional way for displaying the less quantifiable aspects of their work.

The above examples are merely illustrative of the many applications of the system and method of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:

1. A method of training at least one machine learning model to classify one or more activities of a plurality of users of a social network as being fake, the method being implemented by at least one server configured to execute a plurality of programmatic instructions and comprising:
storing, in at least one database coupled to the at least one server, a first labeled dataset of a first plurality of creators and a second labeled dataset of a second plurality of creators;
identifying a first plurality of features in the first labeled dataset and a second plurality of features in the second labeled dataset;
identifying a third feature with reference to the first labeled dataset and the second labeled dataset;
providing to the at least one machine learning model data from the first labeled dataset and the second labeled dataset for training, wherein the at least one machine learning model is configured to use the first plurality of features, the second plurality of features, and the third feature to generate an output classifying said data as fake or non-fake;
determining, for each data, an error between the output generated by the at least one machine learning model and a known output, wherein the output corresponds to classifying at least one of the first plurality of creators in one of low risk, average risk, high risk or very high risk group based on a percentage of posts associated with the at least one of the first plurality of creators identified as fake;
performing back propagation, by the at least one machine learning model, based on the error to correct one or more parameters of the at least one machine learning model;
determining a first metric, a second metric and a third metric to validate a quality of the output generated by the at least one machine learning model; and
stopping the training if the first metric, the second metric and the third metric achieve a first predefined value, a second predefined value and a third predefined value, respectively.

2. The method of claim 1, wherein the first labeled dataset includes data indicative of profiles and posts of the first plurality of creators characterized by fake activity, and wherein the second labeled dataset includes data indicative of profiles and posts of the second plurality of creators characterized by non-fake activity.

3. The method of claim 2, wherein each of the second plurality of creators is characterized by having less than a predefined threshold number of followers.

4. The method of claim 3, wherein the first labeled dataset includes a first portion of the first plurality of creators characterized by having bought followers and a second portion of the first plurality of creators characterized by having bought likes.

5. The method of claim 1, wherein the first plurality of features includes data indicative of at least one of a ratio of a value indicative of a number of followers to a value indicative of at least one of a number of persons followed, a length of description, a length of a full name, a length of a username, a difference between the full name length and the username length, a number of digits in the username, a value indicative of a number of posts relative to a number of followers, or a value indicative of a number of posts relative to number of persons being followed.

6. The method of claim 1, wherein the second plurality of features comprises at least one of data indicative of a distribution of a number of likes and comments on posts or a frequency of publications using one or more statistical characteristics.

7. The method of claim 1, wherein the third feature is a function of a number of the first plurality of creators in the first labeled dataset and a number of the second plurality of creators in the second labeled dataset.

8. The method of claim 1, wherein the first metric corresponds to precision, the second metric corresponds to recall and the third metric corresponds to a value indicative of how well the machine learning model has learned to separate fake creators from non-fake creators.

9. The method of claim 8, wherein the first predefined value corresponding to the first metric has a value in a range of 0.1 to 0.9, the second predefined value corresponding to the second metric has a value in a range of 0.1 to 0.9 and the third predefined value corresponding to the third metric has a value in a range of 0.1 to 0.9.

10. A method of training at least one machine learning model to classify one or more activities of a plurality of users of a social network as being fake, the method being implemented by at least one server configured to execute a plurality of programmatic instructions, wherein, when executed, the plurality of programmatic instructions:
  store, in at least one database coupled to the at least one server, a first labeled dataset of a first set of creators and a second labeled dataset of a second set of creators;
  identify a first set of features in the first labeled dataset and a second set of features in the second labeled dataset;
  provide data to the at least one machine learning model for training, wherein the data is sourced from the first labeled dataset and the second labeled dataset;
  using the at least one machine learning model, generate an output classifying said data as fake or non-fake using the first set of features and the second set of features;
  based on the generated output, classify at least one of the first set of creators in at least one of a low risk, average risk, high risk, or very high risk level, wherein the generated output is based on a percentage of posts associated with the at least one of the first set of creators identified as fake;
  determine an error between the generated output and a known output; perform back propagation based on the error to correct one or more parameters of the at least one machine learning model;
  determine a first metric and a second metric to validate a quality of the generated output; and
  stop the training if the first metric and the second metric achieve a first predefined value and a second predefined value, respectively.

11. The method of claim 10, wherein, when executed, the plurality of programmatic instructions identify a third feature with reference to the first labeled dataset and the second labeled dataset.

12. The method of claim 11, wherein the at least one machine learning model is further configured to use the third feature to generate the generated output.

13. The method of claim 11, wherein, when executed, the plurality of programmatic instructions further determine a third metric to validate the quality of the generated output.

14. The method of claim 13, wherein, when executed, the plurality of programmatic instructions further stops the training if the third metric achieves a third predefined value.

15. The method of claim 14, wherein the first predefined value corresponding to the first metric has a value in a range of 0.1 to 0.9, the second predefined value corresponding to the second metric has a value in a range of 0.1 to 0.9 and the third predefined value corresponding to the third metric has a value in a range of 0.1 to 0.9.

16. The method of claim 10, wherein the first labeled dataset includes data indicative of profiles and posts of the first set of creators characterized by fake activity, and wherein the second labeled dataset includes data indicative of profiles and posts of the second set of creators characterized by non-fake activity.

17. The method of claim 16, wherein each of the second set of creators is characterized by having less than a predefined threshold number of followers.

18. The method of claim 10, wherein the first set of features includes data indicative of at least one of a ratio of a value indicative of a number of followers to a value indicative of at least one of a number of persons followed, a length of description, a length of a full name, a length of a username, a difference between the full name length and the username length, a number of digits in the username, a value indicative of a number of posts relative to a number of followers, or a value indicative of a number of posts relative to number of persons being followed.

19. The method of claim 10, wherein the second set of features comprises at least one of data indicative of a distribution of a number of likes and comments on posts or a frequency of publications using one or more statistical characteristics.

20. The method of claim 12, wherein the third feature is a function of a number of the first set of creators in the first labeled dataset and a number of the second set of creators in the second labeled dataset.

21. The method of claim 13, wherein the first metric corresponds to precision, the second metric corresponds to recall and the third metric corresponds to a value indicative of how well the machine learning model has learned to separate fake creators from non-fake creators.

* * * * *